US011335150B2

(12) United States Patent
Fisher

(10) Patent No.: US 11,335,150 B2
(45) Date of Patent: *May 17, 2022

(54) ELECTRONIC LOCKBOX WITH INTERFACE TO OTHER ELECTRONIC LOCKS

(71) Applicant: SentriLock, LLC, Cincinnati, OH (US)

(72) Inventor: Scott R. Fisher, West Chester, OH (US)

(73) Assignee: SentriLock, LLC, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/951,170

(22) Filed: Nov. 18, 2020

(65) Prior Publication Data

US 2021/0074103 A1    Mar. 11, 2021

Related U.S. Application Data

(63) Continuation of application No. 16/424,880, filed on May 29, 2019, now Pat. No. 10,846,964.
(Continued)

(51) Int. Cl.
*G07C 9/21* (2020.01)
*G07C 9/00* (2020.01)
*H04W 4/021* (2018.01)

(52) U.S. Cl.
CPC .......... *G07C 9/21* (2020.01); *G07C 9/00309* (2013.01); *G07C 9/00571* (2013.01);
(Continued)

(58) Field of Classification Search
CPC .. G07C 9/21; G07C 9/00309; G07C 9/00571; G07C 9/00904; G07C 2009/00317;
(Continued)

(56) References Cited

U.S. PATENT DOCUMENTS 5,654,696 A    8/1997   Barrett
5,705,991 A    1/1998   Kniffin
(Continued)

FOREIGN PATENT DOCUMENTS

EP    2355050        8/2011
WO    1993014571     7/1993
(Continued)

OTHER PUBLICATIONS

Extended European Search Report, 10 pages (dated Feb. 9, 2022).

*Primary Examiner* — James J Yang
(74) *Attorney, Agent, or Firm* — Frederick H. Gribbell; Russell F. Gribbell

(57) ABSTRACT

An electronic lock system that uses an intermediary controller ("IMC"), such as an electronic lockbox, to communicate with an electronic lock that protects buildings, such as dwellings. The IMC also communicates with a wireless portable computer ("WPC"), such as a smart phone, so that an authorized user can first authenticate credentials to the IMC, then have the IMC (or the WPC) send appropriate messages to the electronic lock to command that lock to unlock. The IMC must initially be setup by an ADMIN, so that the IMC's memory contains the specific codes and protocols to successfully communicate with the electronic lock. In this manner, the user can obtain access to the building without specific knowledge of those specific codes and protocols required by the electronic lock. An alarm panel on a building could also be disarmed by the IMC, if its specific codes and protocols are first setup into the IMC's memory.

15 Claims, 11 Drawing Sheets

Related U.S. Application Data

(60) Provisional application No. 62/679,132, filed on Jun. 1, 2018.

(52) U.S. Cl.
CPC ........ *G07C 9/00904* (2013.01); *H04W 4/021* (2013.01); *G07C 2009/00317* (2013.01); *G07C 2009/00769* (2013.01)

(58) Field of Classification Search
CPC ........... G07C 2009/00769; G07C 9/27; H04W 4/021; H04W 4/027; H04W 4/80; H04W 4/90
See application file for complete search history.

(56) References Cited

U.S. PATENT DOCUMENTS

| | | |
|---|---|---|
| 6,472,973 B1 | 10/2002 | Harold |
| 6,624,742 B1 | 9/2003 | Romano |
| 6,822,553 B1 | 11/2004 | Henderson |
| 6,842,105 B1 | 1/2005 | Henderson |
| 6,937,140 B1 | 8/2005 | Outslay |
| 7,177,819 B2 | 2/2007 | Muncaster |
| 7,606,558 B2 | 10/2009 | Despain |
| 7,880,584 B2 | 2/2011 | Larson |
| 8,040,218 B2 | 10/2011 | Hays |
| 9,336,637 B2 | 5/2016 | Neil |
| 9,747,739 B2 * | 8/2017 | Gengler ............. G07C 9/00571 |
| 2002/0107010 A1 | 8/2002 | Witte |
| 2003/0061192 A1 | 3/2003 | McGunn |
| 2004/0219903 A1 | 11/2004 | Despain |
| 2007/0156758 A1 | 7/2007 | Adiga |
| 2008/0246587 A1 | 10/2008 | Fisher |
| 2009/0153291 A1 | 6/2009 | Larson |
| 2010/0245107 A1 | 9/2010 | Fulker |
| 2011/0251876 A1 | 10/2011 | Fisher |
| 2011/0254659 A1 | 10/2011 | Bowen |
| 2012/0068817 A1 | 3/2012 | Fisher |
| 2012/0208520 A1 | 8/2012 | Howarter |
| 2012/0213362 A1 | 8/2012 | Bliding |
| 2013/0127593 A1 * | 5/2013 | Kuenzi .............. G07C 9/00817 340/5.61 |
| 2013/0214903 A1 | 8/2013 | Kalous |
| 2014/0225713 A1 | 8/2014 | McIntyre |
| 2014/0236350 A1 | 8/2014 | Woodard |
| 2014/0266586 A1 | 9/2014 | Fisher |
| 2014/0359292 A1 | 12/2014 | Kawamura |
| 2016/0119961 A1 | 4/2016 | Hrabak |
| 2016/0197893 A1 | 7/2016 | Wendling |
| 2016/0353239 A1 | 12/2016 | Kiellsson |
| 2016/0364929 A1 * | 12/2016 | Fisher ................ G07C 9/00174 |
| 2019/0259231 A1 | 8/2019 | Mukundala |
| 2020/0168015 A1 * | 5/2020 | Rosenberg ......... G07C 9/00571 |

FOREIGN PATENT DOCUMENTS

| | | |
|---|---|---|
| WO | 2011065892 | 6/2011 |
| WO | 2016200814 | 12/2016 |

* cited by examiner

ELECTRONIC LOCKBOX WITH INTERFACE TO OTHER ELECTRONIC LOCKS

CROSS-REFERENCE TO RELATED APPLICATIONS

The present application is a continuation of application Ser. No. 16/424,880, titled "ELECTRONIC LOCKBOX WITH INTERFACE TO OTHER ELECTRONIC LOCKS," filed on May 29, 2019, now to become U.S. Pat. No. 10,846,964, issuing on Nov. 24, 2020; and claims priority to provisional patent application Ser. No. 62/679,132, titled "ELECTRONIC LOCKBOX WITH INTERFACE TO OTHER ELECTRONIC LOCKS," filed on Jun. 1, 2018.

TECHNICAL FIELD

The technology disclosed herein relates generally to electronic locks and electronic lockbox systems and is particularly directed to a system of the type that includes a wireless portable computer (such as a smart phone, or a tablet computer; electronic products that are sometimes referred to "smart devices") that communicates with an electronic lockbox using a low power radio link. Embodiments are specifically disclosed as using a wireless portable computer (a "WPC") that includes both a low power radio to communicate to the lockbox and a wide area network (WAN) radio to communicate to a central computer, and optionally includes a Global Positioning System (GPS) receiver to determine approximate physical location of the lockbox when in communication with the lockbox. (The central computer in some systems is often referred to as a "central clearinghouse computer" or "CCC".)

A further embodiment is disclosed involving the wireless portable computer that communicates to an electronic lockbox using a low power radio and that communicates to a central computer using a wide area network radio. In the more advanced functions of this technology, the WPC can comprise a smart phone, which can run application software programs (called "APPS"), to customize the functions executed by the smart phone, and to allow certain information (including information residing on the central computer) to be displayed on the smart phone.

Embodiments are also disclosed as a system having an electronic lockbox (or other type of secure electronic product) that sends identifying data to the WPC via a low power radio, and the WPC relays that data to the central computer. Examples of such data include attempted accesses of the electronic lock system, including successful attempts; the electronic equipment typically keeps an "event log" and an "access log" of such access attempts, successful or otherwise.

In many "newer" dwellings or other types of buildings, the access points are securely controlled by some type of electronic lock, rather than by a mechanical lock. Such electronic security products will be generally referred to herein as "EL", which reflects their characteristics as being electronic locks. Such dwellings/buildings may also contain an alarm system in addition to having an electronic lock (an EL). Alternatively, some dwellings/buildings can have a mechanical lock, but still have an alarm system.

In some situations, such as in real estate sales, a real estate sales agent (such as a REALTOR®) will arrive at a dwelling that is for sale and then "show" that dwelling to a potential buyer (which is typically referred to as a "showing"). To conduct that showing, the real estate sales agent obviously needs to obtain access to the interior spaces of that dwelling. In the past, the sales agent (commonly known as the "showing agent") would obtain access to an electronic lockbox that contained a mechanical key to the dwelling door, and then enter that dwelling. However, if the dwelling is protected by an electronic lock, then a mechanical key would not typically be available, and instead, the sales agent would need an appropriate "App" installed on their WPC and have the correct credentials for the dwelling owner's electronic lock. The technology disclosed herein will automate that rather bulky procedure and provide a seamless interface for both mechanical locks and their keys, plus electronic door locks that are increasingly found on properties.

In some applications for this technology, a different kind of electronic "lock" could be used in lieu of an electronic "lockbox"; and furthermore, in many applications for this technology, an electronic controller (also known as a "system on a chip") alternatively could be used in lieu of an electronic lockbox. In the new system disclosed herein, the three types of electronic products just described (i.e., the lockbox, the different kind of electronic lock, and the system on a chip) can act as an "intermediary controller" (sometimes referred to herein as an "IMC"), which will operate as described below.

In a real estate sales situation using this new system, the showing agent would use his or her WPC to communicate to the IMC, which is an electronic product that is typically installed by another real estate sales agent (commonly known as the "listing agent"). The IMC would first authenticate the showing agent's WPC and any other information that the showing agent is required to provide; if everything is in order, then the IMC (or the WPC) will communicate with the dwelling's electronic lock (the EL), to establish a communications session between the IMC and the EL. During that session, the IMC (or the WPC) will send the appropriate information to the EL that will authenticate the IMC to the EL, and the EL will respond by allowing the showing agent to obtain access to the dwelling.

In the above example using this new system, there would need to be a previous "setup" procedure performed between the IMC and the EL. In a typical real estate sales situation, for example, the listing agent (who typically owns the IMC) would install the IMC (e.g., an electronic lockbox or a system on a chip) at the site of the specific dwelling that is being protected by the EL. During a "setup" session, the IMC would be loaded with the necessary data that will later allow the IMC (or the WPC) to communicate with the EL, and also to send the appropriate protocol and security code information to the EL so that the EL will open for a later showing agent who has the appropriate authorization.

The types of buildings and human personnel that can use this system is not limited to real estate sales. Dwellings could be accessed by medical caregivers, for example, to visit human occupants of those dwellings; the dwelling is not "on sale" in that situation. Dwellings and other building could be accessed by government inspectors or utility company personnel, for example, particularly in large housing projects, or perhaps in relatively remote areas where infrequent visits are needed to buildings that are either unmanned or are manned only at certain times or certain days of the week.

STATEMENT REGARDING FEDERALLY SPONSORED RESEARCH OR DEVELOPMENT

None.

BACKGROUND

Traditionally, lockboxes have stored a physical key for use by a third party (a showing agent, for example) to enter a dwelling or a building. Newer electronic locks may not necessarily use a physical key, but rather a digital key (e.g., a numeric code) that is relayed wirelessly to the electronic lock. In order to access a dwelling or building protected by such an electronic lock, a traditional lockbox may be of limited value, because there may be no physical key available.

Even the "newer" conventional lockboxes that have wireless communications ability may be of limited utility, although some such lockboxes may at least be able to send a message to an electronic key, in which that message might provide unlocking codes that could be displayed to a human user, for use in disarming the electronic lock on that dwelling or building. In that scenario, the human user would still be required to enter the "code" information at the building's electronic lock, which is an additional step that could be prone to human error.

SUMMARY

Accordingly, it is an advantage to provide an electronic locking system in which an electronic intermediary controller is used to communicate to a wireless portable computer (a "WPC") such as a smart phone, and the electronic intermediary controller (or the WPC) is used to communicate to an electronic lock that protects a dwelling or other type of building, in which the human USER only needs to have authorization to access the electronic intermediary controller, and the system will automatically obtain access to the electronic lock that protects the dwelling/building.

It is another advantage to provide an electronic locking system in which an electronic lockbox (acting as an intermediary controller) is used to communicate to a wireless portable computer such as a smart phone, and the electronic lockbox (or the WPC) is used to communicate to an electronic lock that protects a dwelling or other type of building, in which the human USER only needs to have authorization to access the electronic lockbox, and the system will automatically obtain access to the electronic lock that protects the dwelling/building.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, an electronic lockbox system is provided, which comprises: (a) an electronic lockbox, the electronic lockbox comprising a first processing circuit, a first memory circuit including instructions executable by the first processing circuit, a first short range wireless communications circuit, and a secure compartment at least a portion of which is movable and is under the control of the first processing circuit, wherein the electronic lockbox is assigned to a specific property; (b) a portable computer, the portable computer comprising a second processing circuit, a second memory circuit including instructions executable by the second processing circuit, a display, a user operated input circuit, and a second short range wireless communications circuit; and (c) an electronic lock used to protect the specific property, the electronic lock comprising a third processing circuit, a third memory circuit including instructions executable by the third processing circuit, a third short range wireless communications circuit, and a physical lock that is under the control of the third processing circuit; (d) wherein the first, second, and third processing circuits are configured: (i) to connect between the portable computer and the electronic lockbox, by communicating first data messages between the first and second short range wireless communications circuits, the first data messages including first security information; (ii) at the electronic lockbox, to perform a credentials authorization routine using the first processing circuit to analyze the first security information received from the portable computer; (iii) if the portable computer has sent valid credentials, then to connect between the electronic lockbox and the electronic lock, by communicating second data messages between the first and third short range wireless communications circuits, the second data messages including second security information that was previously stored in the first memory circuit; (iv) at the electronic lock, to perform a security authorization routine using the third processing circuit to analyze the second security information received from the electronic lockbox; and (v) if the electronic lockbox has sent valid security information, then at the electronic lock, to authorize the electronic lockbox to send predetermined commands that will be obeyed by the electronic lock.

In accordance with another aspect, a wireless controller remote locking system is provided, which comprises: (a) wireless controller, the wireless controller comprising a first processing circuit, a first memory circuit including instructions executable by the first processing circuit, and a first short range wireless communications circuit, wherein the wireless controller is assigned to a specific property; (b) a portable computer, the portable computer comprising a second processing circuit, a second memory circuit including instructions executable by the second processing circuit, a display, a user operated input circuit, and a second short range wireless communications circuit; and (c) an electronic lock used to protect the specific property, the electronic lock comprising a third processing circuit, a third memory circuit including instructions executable by the third processing circuit, a third short range wireless communications circuit, and a physical lock that is under the control of the third processing circuit; (d) wherein the first, second, and third processing circuits are configured: (i) to connect between the portable computer and the wireless controller, by communicating first data messages between the first and second short range wireless communications circuits, the first data messages including first security information; (ii) at the wireless controller, to perform a credentials authorization routine using the first processing circuit to analyze the first security information received from the portable computer; (iii) if the portable computer has sent valid credentials, then to connect between the wireless controller and the electronic lock, by communicating second data messages between the first and third short range wireless communications circuits, the second data messages including second security information that was previously stored in the first memory circuit; (iv) at the electronic lock, to perform a security authorization routine using the third processing circuit to analyze the second security information received from the wireless controller; and (v) if the wireless controller has sent valid security information, then at the electronic lock, to authorize the wireless controller to send predetermined commands that will be obeyed by the electronic lock.

In accordance with yet another aspect, a method for setting up an electronic lock security system is provided, in which the method comprises the following steps: (a) providing an intermediary controller, the intermediary controller comprising a first processing circuit, a first memory circuit including instructions executable by the first processing circuit, and a first short range wireless communications circuit, wherein the intermediary controller is assigned to a specific property; (b) providing a portable computer, the portable computer comprising a second processing circuit, a second memory circuit including instructions executable by the second processing circuit, a display, a user operated input circuit, and a second short range wireless communications circuit; and (c) providing an electronic lock used to protect the specific property, the electronic lock comprising a third processing circuit, a third memory circuit including instructions executable by the third processing circuit, a third short range wireless communications circuit, and a physical lock that is under the control of the third processing circuit; (d) wherein the first, second, and third processing circuits are configured to perform the following functions: (i) connecting the portable computer to the intermediary controller by communicating first data messages between the first and second short range wireless communications circuits, the first data messages including first security information; (ii) performing a credentials authorization routine using the first processing circuit of the intermediary controller, to analyze the first security information received from the portable computer; (iii) if the portable computer has sent valid credentials, then identifying a specific type of the electronic lock, including lock protocol information; (iv) after activating the electronic lock, sending second security information from the portable computer to the electronic lock, first by communicating second data messages between the first and second short range wireless communications circuits, then by communicating third data messages between the second and third short range wireless communications circuits, the second security information including at least a security code and lock protocol information pertaining to the electronic lock; (v) if the electronic lock validates the second security information, then sending a notification of the successful validation to the portable computer from the electronic lock, using the first, second, and third short range wireless communications circuits; and (vi) storing second security information in the first memory circuit, for later use by other authorized visitors at the specific property.

In accordance with still another aspect, an electronic lockbox system is provided, which comprises: (a) an electronic lockbox, the electronic lockbox comprising a first processing circuit, a first memory circuit including instructions executable by the first processing circuit, a first short range wireless communications circuit, and a secure compartment at least a portion of which is movable and is under the control of the first processing circuit, wherein the electronic lockbox is assigned to a specific property; (b) a portable computer, the portable computer comprising a second processing circuit, a second memory circuit including instructions executable by the second processing circuit, a display, a user operated input circuit, and a second short range wireless communications circuit; and (c) an alarm control panel used to protect the specific property, the alarm control panel comprising a third processing circuit, a third memory circuit including instructions executable by the third processing circuit, and a third short range wireless communications circuit; (d) wherein the first, second, and third processing circuits are configured: (i) to connect between the portable computer and the electronic lockbox, by communicating first data messages between the first and second short range wireless communications circuits, the first data messages including first security information; (ii) at the electronic lockbox, to perform a credentials authorization routine using the first processing circuit to analyze the first security information received from the portable computer; (iii) if the portable computer has sent valid credentials, then to connect between the electronic lockbox and the alarm control panel, by communicating second data messages between the first and third short range wireless communications circuits, the second data messages including second security information that was previously stored in the first memory circuit; (iv) at the alarm control panel, to perform a security authorization routine using the third processing circuit to analyze the second security information received from the electronic lockbox; and (v) if the electronic lockbox has sent valid security information, then at the alarm control panel, to authorize the electronic lockbox to send a predetermined command that will disarm the alarm control panel.

In accordance with a further aspect, a method for operating an electronic lock security system is provided, in which the method comprises the following steps: (a) providing an intermediary controller, the intermediary controller comprising a first processing circuit, a first memory circuit including instructions executable by the first processing circuit, and a first short range wireless communications circuit, wherein the intermediary controller is assigned to a specific property; (b) providing a portable computer, the portable computer comprising a second processing circuit, a second memory circuit including instructions executable by the second processing circuit, a display, a user operated input circuit, and a second short range wireless communications circuit; and (c) providing an electronic lock used to protect the specific property, the electronic lock comprising a third processing circuit, a third memory circuit including instructions executable by the third processing circuit, a third short range wireless communications circuit, and a physical lock that is under the control of the third processing circuit; (d) wherein the first, second, and third processing circuits are configured to perform the following functions: (i) storing, at the intermediary controller, an electronic lock authorization credential pertaining to the electronic lock; (ii) communicating data messages between the portable computer and the intermediary controller, and performing an authentication routine between the intermediary controller and the portable computer; (iii) if there is a successful authentication between the intermediary controller and the portable computer, then communicating the electronic lock authorization credential from the intermediary controller to the electronic lock; and (iv) after the electronic lock has received valid electronic lock authorization credential from the intermediary controller, then sending at least one predetermined command that will be obeyed by the electronic lock.

In accordance with a yet further aspect, a method for operating an electronic lock security system is provided, in which the method comprises the following steps: (a) providing an intermediary controller, the intermediary controller comprising a first processing circuit, a first memory circuit including instructions executable by the first processing circuit, and a first short range wireless communications circuit, wherein the intermediary controller is assigned to a specific property; (b) providing a portable computer, the portable computer comprising a second processing circuit, a second memory circuit including instructions executable by the second processing circuit, a display, a user operated input circuit, and a second short range wireless communications circuit; and (c) providing an electronic lock used to protect the specific property, the electronic lock comprising a third processing circuit, a third memory circuit including instructions executable by the third processing circuit, a third short range wireless communications circuit, and a physical lock that is under the control of the third processing circuit; (d) wherein the first, second, and third processing circuits are configured to perform the following functions: (i) pairing the intermediary controller with the electronic lock; (ii) sending pairing information and protocol information relating to the operation of the electronic lock from the portable computer, under control of an ADMIN, to the intermediary controller; and (iii) storing the pairing information and protocol information in the first memory circuit for later use by a USER who will attempt to open the electronic lock.

In accordance with still a further aspect, an electronic lockbox system is provided, which comprises: (a) an electronic lockbox, the electronic lockbox comprising a first processing circuit, a first memory circuit including instructions executable by the first processing circuit, a first short range wireless communications circuit, and a secure compartment at least a portion of which is movable and is under the control of the first processing circuit, wherein the electronic lockbox is assigned to a specific property; (b) a portable computer, the portable computer comprising a second processing circuit, a second memory circuit including instructions executable by the second processing circuit, a display, a user operated input circuit, and a second short range wireless communications circuit; and (c) an electronic lock used to protect the specific property, the electronic lock comprising a third processing circuit, a third memory circuit including instructions executable by the third processing circuit, a third short range wireless communications circuit, and a physical lock that is under the control of the third processing circuit; (d) wherein the first, second, and third processing circuits are configured: (i) to connect between the portable computer and the electronic lockbox, by communicating first data messages between the first and second short range wireless communications circuits, the first data messages including first security information; (ii) at the electronic lockbox, to perform a credentials authorization routine using the first processing circuit to analyze the first security information received from the portable computer; (iii) if the portable computer has sent valid credentials, then to connect between the electronic lock and at least one of the electronic lockbox and the portable computer, by communicating second data messages between at least two of the first, second, and third short range wireless communications circuits, the second data messages including second security information that was previously stored in the first memory circuit; (iv) at the electronic lock, to perform a security authorization routine using the third processing circuit to analyze the second security information; and (v) if at least one of the electronic lockbox and the portable computer has sent valid security information, then at the electronic lock, to authorize at least one of the electronic lockbox and the portable computer to send predetermined commands that will be obeyed by the electronic lock.

In accordance with another aspect, a wireless controller remote locking system is provided, which comprises: (a) a wireless controller, the wireless controller comprising a first processing circuit, a first memory circuit including instructions executable by the first processing circuit, and a first short range wireless communications circuit, wherein the wireless controller is assigned to a specific property; (b) a portable computer, the portable computer comprising a second processing circuit, a second memory circuit including instructions executable by the second processing circuit, a display, a user operated input circuit, and a second short range wireless communications circuit; and (c) an electronic lock used to protect the specific property, the electronic lock comprising a third processing circuit, a third memory circuit including instructions executable by the third processing circuit, a third short range wireless communications circuit, and a physical lock that is under the control of the third processing circuit; (d) wherein the first, second, and third processing circuits are configured: (i) to connect between the portable computer and the wireless controller, by communicating first data messages between the first and second short range wireless communications circuits, the first data messages including first security information; (ii) at the wireless controller, to perform a credentials authorization routine using the first processing circuit to analyze the first security information received from the portable computer; (iii) if the portable computer has sent valid credentials, then to connect between the electronic lock and at least one of the wireless controller and the portable computer, by communicating second data messages between at least two of the first, second, and third short range wireless communications circuits, the second data messages including second security information that was previously stored in the first memory circuit; (iv) at the electronic lock, to perform a security authorization routine using the third processing circuit to analyze the second security information; and (v) if at least one of the wireless controller and the portable computer has sent valid security information, then at the electronic lock, to authorize at least one of the wireless controller and the portable computer to send predetermined commands that will be obeyed by the electronic lock.

In accordance with yet another aspect, a method for operating an electronic lock security system is provided, in which the method comprises the following steps: (a) providing an intermediary controller, the intermediary controller comprising a first processing circuit, a first memory circuit including instructions executable by the first processing circuit, and a first short range wireless communications circuit, wherein the intermediary controller is assigned to a specific property; (b) providing a portable computer, the portable computer comprising a second processing circuit, a second memory circuit including instructions executable by the second processing circuit, a display, a user operated input circuit, and a second short range wireless communications circuit; and (c) providing an electronic lock used to protect the specific property, the electronic lock comprising a third processing circuit, a third memory circuit including instructions executable by the third processing circuit, a third short range wireless communications circuit, and a physical lock that is under the control of the third processing circuit; (d) wherein the first, second, and third processing circuits are configured to perform the following functions: (i) connecting the portable computer to the intermediary controller by communicating first data messages between the first and second short range wireless communications circuits, the first data messages including first security information; (ii) performing a credentials authorization routine using the first processing circuit of the intermediary controller, to analyze the first security information received from the portable computer; (iii) if the portable computer has sent valid credentials, then identifying a specific type of the electronic lock, including lock protocol information; (iv) after activating the electronic lock, sending second security information to the electronic lock, first by communicating second data messages between the first and second short range wireless communications circuits, then by communicating third data messages between the third short range wireless communications circuit, and at least one of the first and second short range wireless communications circuits, the second security information including at least a security code using appropriate lock protocol information pertaining to the electronic lock; (v) if the electronic lock validates the second security information, then sending a notification of the successful validation to at least one of the intermediary controller and the portable computer, using at least two of the first, second, and third short range wireless communications circuits; and (vi) storing the second security information in the first memory circuit, for later use by other authorized visitors at the specific property.

In accordance with still another aspect, an electronic lockbox system is provided, which comprises: (a) an electronic lockbox, the electronic lockbox comprising a first processing circuit, a first memory circuit including instructions executable by the first processing circuit, a first short range wireless communications circuit, and a secure compartment at least a portion of which is movable and is under the control of the first processing circuit, wherein the electronic lockbox is assigned to a specific property; (b) a portable computer, the portable computer comprising a second processing circuit, a second memory circuit including instructions executable by the second processing circuit, a display, a user operated input circuit, and a second short range wireless communications circuit; and (c) an alarm control panel used to protect the specific property, the alarm control panel comprising a third processing circuit, a third memory circuit including instructions executable by the third processing circuit, and a third short range wireless communications circuit; (d) wherein the first, second, and third processing circuits are configured: (i) to connect between the portable computer and the electronic lockbox, by communicating first data messages between the first and second short range wireless communications circuits, the first data messages including first security information; (ii) at the electronic lockbox, to perform a credentials authorization routine using the first processing circuit to analyze the first security information received from the portable computer; (iii) if the portable computer has sent valid credentials, then to connect between the alarm control panel and at least one of the electronic lockbox and the portable computer, by communicating second data messages between at least two of the first, second, and third short range wireless communications circuits, the second data messages including second security information that was previously stored in the first memory circuit; (iv) at the alarm control panel, to perform a security authorization routine using the third processing circuit to analyze the second security information; and (v) if at least one of the electronic lockbox and the portable computer has sent valid security information, then at the alarm control panel, to authorize at least one of the electronic lockbox and the portable computer to send a predetermined command that will be obeyed by the alarm control panel.

In accordance with a further aspect, a method for operating an electronic lock security system is provided, in which the method comprises the following steps: (a) providing an intermediary controller, the intermediary controller comprising a first processing circuit, a first memory circuit including instructions executable by the first processing circuit, and a first short range wireless communications circuit, wherein the intermediary controller is assigned to a specific property; (b) providing a portable computer, the portable computer comprising a second processing circuit, a second memory circuit including instructions executable by the second processing circuit, a display, a user operated input circuit, and a second short range wireless communications circuit; and (c) providing an electronic lock used to protect the specific property, the electronic lock comprising a third processing circuit, a third memory circuit including instructions executable by the third processing circuit, a third short range wireless communications circuit, and a physical lock that is under the control of the third processing circuit; (d) wherein the first, second, and third processing circuits are configured to perform the following functions: (i) storing, at the intermediary controller, an electronic lock authorization credential pertaining to the electronic lock; (ii) communicating data messages between the portable computer and the intermediary controller, and performing an authentication routine between the intermediary controller and the portable computer; (iii) if there is a successful authentication between the intermediary controller and the portable computer, then communicating the electronic lock authorization credential to the electronic lock; and (iv) after the electronic lock has received valid electronic lock authorization credential, then sending at least one predetermined command that will be obeyed by the electronic lock.

In accordance with a yet further aspect, a method for operating an electronic lock security system is provided, in which the method comprises the following steps: (a) providing an intermediary controller, the intermediary controller comprising a first processing circuit, a first memory circuit including instructions executable by the first processing circuit, and a first short range wireless communications circuit, wherein the intermediary controller is assigned to a specific property; (b) providing a portable computer, the portable computer comprising a second processing circuit, a second memory circuit including instructions executable by the second processing circuit, a display, a user operated input circuit, and a second short range wireless communications circuit; and (c) providing an electronic lock used to protect the specific property, the electronic lock comprising a third processing circuit, a third memory circuit including instructions executable by the third processing circuit, a third short range wireless communications circuit, and a physical lock that is under the control of the third processing circuit; (d) wherein the first, second, and third processing circuits are configured to perform the following functions: (i) sending pairing information and protocol information relating to the operation of the electronic lock, under control of an ADMIN, to the intermediary controller; and (ii) pairing the electronic lock with at least one of the intermediary controller and the portable computer; (iii) storing the pairing information and protocol information in the first memory circuit for later use by a USER who will attempt to open the electronic lock.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
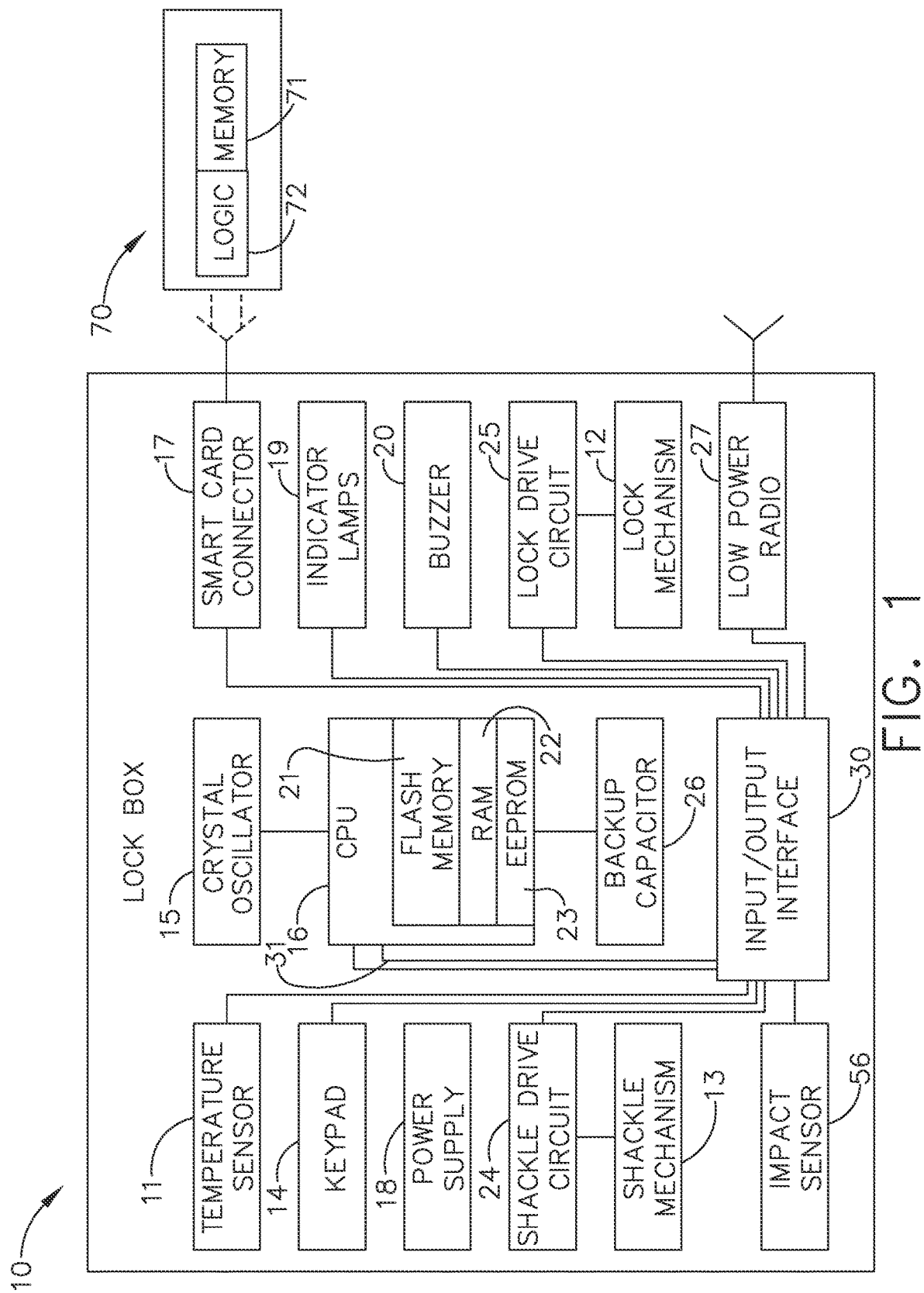
FIG. 1 is a schematic block diagram of the electrical components of an electronic lockbox, as constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The terms "first" and "second" preceding an element name, e.g., first inlet, second inlet, etc., are used for identification purposes to distinguish between similar or related elements, results or concepts, and are not intended to necessarily imply order, nor are the terms "first" and "second" intended to preclude the inclusion of additional similar or related elements, results or concepts, unless otherwise indicated.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components, may be utilized to implement the technology disclosed herein.

It will be understood that the term "circuit" as used herein can represent an actual electronic circuit, such as an integrated circuit chip (or a portion thereof), or it can represent a function that is performed by a processing device, such as a microprocessor or an ASIC that includes a logic state machine or another form of processing element (including a sequential processing device). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventor, and are within the principles of the technology when discussing a "circuit."

Setup of Main System

Each user in the system installs application software (known as an "APP") on their wireless portable computer (e.g., a wireless portable computer, electronic key, or a smart phone that may include a GPS receiver, or other type of mobile device) that communicates with the central clearinghouse computer (CCC) over the wide area network (WAN). The application (APP) identifies itself to the CCC via user login credentials and can remain active on the user's portable communication circuit to receive notifications and data from the CCC in near real time (assuming the portable device is in communication range with a cellular tower, or other type of communications node).

In one embodiment, the application on the portable communication device relies on GPS information to determine when it is appropriate to send data to the user's device based on the activity of the user's agent or representative. Most real estate agents have multiple clients, and therefore the CCC must be able to track which client the agent is working with at the time to send the proper data to various users of the system. In the case of seller's agents being matched with sellers, the system utilizes the location of the lockbox, whether pre-assigned by the seller's agent in the CCC database or by GPS information collected through accesses of one or more buyer's agents. For buyer's agents, the CCC identifies both the buyer's agent and the prospective buyer by matching their respective GPS locations and times corresponding to access events at the lockbox. That is, the buyer would obviously be present at the physical location with the buyer's agent during the process of a home showing; therefore, both would have GPS locations that are proximally close to one another.

The method of relationship identification discussed above requires little if any user intervention. It should be noted that one or more buyers or sellers can be automatically associated with their respective representative, e.g., a husband and wife desiring data notifications responsive to events at the lockbox. Once the relationship is determined by the CCC, future data can be pushed to multiple portable communication devices even if only one participant is present at the showing.

Central Computer

Terminology herein relating to the central computer (CCC) should be understood to encompass one or more physical computers, either together at a single location, or computers that are geographically diverse but that work in concert with one another, to store, retrieve, and otherwise process information relevant to operation of the "system." In today's computing parlance, "the cloud" is one possible representation of a computing platform equivalent to that carried out by the CCC in this disclosure. In the real estate sales technical field, the CCC is sometimes referred to herein as a "central computer" or a "clearinghouse computer."

The CCC will include memory storage products that can hold one or more databases of information; usually one of the databases is updated with new information almost every time a sales agent or a sales prospect communicates with the CCC, under the control of the operating software of the CCC itself. In some applications, as described below, a new database is "started" in the memory of the CCC by certain types of communications and transactions that are initiated by a sales agent or prospect. In many descriptions of this type of equipment, the "database" of the CCC actually represents multiple individual database structures, when viewed from a computer science standpoint—and these are often "relational databases" at that. However, the existence of several database structures is still referred to as a singular tense "database" at times, even though it is understood that a single huge database really comprises more than one type of store of information at the CCC.

Electronic Lockboxes

Referring now to the drawings, FIG. 1 illustrates an exemplary embodiment of an electronic lockbox generally designated by the reference numeral 10, which is suitable for use with the technology disclosed herein. Lockbox 10 has an outer housing, which includes a keypad 14 (see FIG. 2), and the housing includes a movable key compartment door 32 (see FIG. 2). The upper housing of lockbox 10 includes two receptacles (not shown) that receive a shackle 40 (see FIG. 2). The shackle 40 has an upper portion 46, and two shackle extensions (not visible in FIG. 2) that fit through the receptacles. It should be noted that the keypad 14 may also be referred to as a "data input circuit," in which a human user may press one or more of the keys to enter data, such as numeric information.

The electronic circuitry of electronic lockbox 10 is illustrated in block diagram form in FIG. 1. In this illustrated embodiment, electronic lockbox 10 includes a microprocessor (CPU) 16, FLASH memory 21, random access memory (RAM) 22, EEPROM (electrically erasable programmable read only memory) 23, a battery (or other electrical power supply) 18, a memory backup capacitor 26, an ISO-7816 smart card connector 17, indicator LED lamps 19, a piezo buzzer 20, a crystal oscillator 15, a digital temperature sensor 11 (these last two devices can be combined into a single chip), a shackle drive circuit 24, a shackle release mechanism 13, a key compartment mechanism drive circuit 25, a key compartment lock/release mechanism 12, and a membrane style keypad 14 for user data entry. An impact sensor 56 can also be included in electronic lockbox 10, to detect abnormal mechanical forces that might be applied to the device.

An input/output (I/O) interface circuit 30 is included to provide signal conditioning as needed between the CPU 16 and other components that typically use voltage and/or current levels that are not typically able to hook up directly to a processing device, such as sensors and output device driver circuits. Each appropriate I/O signal is directed through a separate channel of the I/O interface circuit 30, unless perhaps more than one signal of a particular voltage and current rating can be multiplexed, in which case a multiplexer circuit can be included in the I/O interface circuit 30. The data signals between I/O circuit 30 and the CPU 16 run through a low voltage signal bus 31.

A data interface in the form of a low power radio 27 is included in this embodiment so that the CPU 16 is able to communicate with other external devices, such as a separate wireless portable computer 100 (see FIG. 2) that uses a compatible wireless data link. (The wireless portable computer can also be referred to as a "mobile device," a "WPC," an "electronic key," or a "smart phone" in some embodiments of this technology.) The wireless portable computer 100 also includes a low power radio 127, which communicates with radio 27 using a protocol that could be proprietary, if desired. However, the radios 27 and 127 could use any number of various communications protocols, such as Bluetooth, although the data structure in the messages between radios 27 and 127 certainly could be encrypted, or otherwise formatted in a proprietary manner Radios 27 and 127 further could comprise other types of wireless communications devices that may not operate on a strictly radio principle, including types of wireless communications devices that have not been invented as of yet. In this description, such wireless communications devices will typically be referred to as "radios;" however, in this patent document they may also be referred to as a "short range wireless communications device," or a "low power wireless communications device."

Microprocessor 16 controls the operation of the electronic lockbox 10 according to programmed instructions (electronic lockbox control software) stored in a memory circuit, such as in FLASH memory 21. RAM memory 22 is typically used to store various data elements such as counters, software variables and other informational data. EEPROM memory 23 is typically used to store more permanent electronic lockbox data such as serial number, configuration information, and other important data. It will be understood that many different types of microprocessors or microcontrollers could be used in the electronic lockbox system 10, and that many different types of memory circuits could be used to store data in both volatile and non-volatile form, without departing from the principles disclosed herein. In one mode of an exemplary embodiment, the electronic lockbox CPU 16 is an 8-bit Atmel Mega8 microcontroller that incorporates RAM 22, FLASH memory 21 and EEPROM memory 23 internally (as on-board memory).

Battery 18 provides the operating electrical power for the electronic lockbox. Capacitor 26 is used to provide temporary memory retention power during replacement of battery 18. It will be understood that an alternative electrical power supply could be used if desired, such as a solar panel with the memory backup capacitor.

As noted above, electronic lockbox 10 includes a shackle 40 that is typically used to attach the box 10 to a door handle or other fixed object. Electronic lockbox 10 also includes a key compartment which typically holds a dwelling key (not shown), and which can be accessed via the key access door 32 (which is also referred to herein as a "controlled access member").

The key compartment lock and release mechanism 12 uses a gear motor mechanism (not shown) that is controlled by drive circuit 25 that in turn is controlled by CPU 16. Shackle release mechanism 13 also uses a gear motor, which is controlled by drive circuit 24 that in turn is controlled by CPU 16. It will be understood that the release or locking mechanisms used for the shackle 40 and key compartment 32 can be constructed of many different types of mechanical or electromechanical devices without departing from the principles disclosed herein.

The crystal oscillator 15 provides a steady or near-constant frequency (e.g., at 32.768 kHz) clock signal to CPU 16's asynchronous timer logic circuit. The ISO-7816 smart card connector 17 connects to electrical contacts on a "smart card" 70 to allow the exchange of data between the electronic lockbox's CPU 26 and memory devices 71 in the smart card 70 (discussed below in greater detail). The smart card 70 itself typically will include some control logic circuits 72, to prevent "easy" or unauthorized access to the memory elements 71 on-board the card 70. Note that such a smart card is not required in some more advanced versions of electronic lockboxes.

It should be noted that an electronic key (such as that described above) could be used as a type of secure memory device for the element at reference numeral 70, rather than a classic "smart card." Such an electronic key would also contain memory elements 71, and perhaps would contain some control logic circuits 72, although the control logic circuits might be optional, depending on the type of electronic key device that is used. With regard to FIG. 1, if an electronic key is used, it could be interfaced to the CPU circuit 16 of the electronic lockbox 10 is many different ways, including via an electrical circuit that makes contact between the lockbox 10 and the electronic key 70 (similar to that depicted on FIG. 1), or perhaps via an electromagnetic signal such as a short range radio wave, or an optical signal. As used herein, the term "electronic key" can have a meaning to include a relatively simple device, such as a secure memory card (or a "smart card"), and it can have a meaning to include a sophisticated device, such as a laptop computer or a smart phone that has a wireless communications circuit to send and receive messages from other devices, including an electronic lockbox and/or a central computer. A "typical" electronic key will generally be a more sophisticated device.

In one embodiment, the digital temperature sensor 11 is read at regular intervals by the electronic lockbox CPU 16 to determine the ambient temperature. Crystal oscillator 15 may exhibit a small change in oscillating characteristics as its ambient temperature changes. In one type of crystal oscillator device, the oscillation frequency drift follows a known parabolic curve around a 25 degrees C. center. The temperature measurements are used by CPU 16 in calculating the drift of crystal 15 and thus compensating for the drift and allowing precise timing measurement regardless of electronic lockbox operating environment temperature. As noted above, a single chip can be used to replace the combination of crystal oscillator 15 and temperature sensor 11, such as a part number DS32KHZ manufactured by Dallas Semiconductor.

The LED indicator lamps 19 and piezo buzzer 20 are included to provide both an audible and a visual feedback of operational status of the electronic lockbox 10. Their specific uses are described in detail in other patent documents by the same inventor, as noted below.

The impact sensor 56 can be used to notify an external device, in case of an attempted removal or other type of damage being done to the lockbox 10, including intentional damage. Such an external device could comprise a "base station" as described in detail in other patent documents by the same inventor, or it could comprise the wireless portable computer 100 that is described herein.

Backup capacitor 26 is charged by battery 18 (or perhaps by another power source) during normal operation. Capacitor 26 serves two functions, the first of which is to maintain adequate voltage to CPU 16 during either shackle drive circuit activation, or lock drive circuit activation. In an exemplary embodiment, capacitor 26 is charged from the regulated side of voltage regulator in power supply 18, whereas all electromechanical drive current is derived from the unregulated side of power supply 18. Capacitor 26 also maintains a stable voltage to CPU 16 during periods of high current drain on power supply 18. The second function of capacitor 26 is to maintain CPU 16 operation and RAM memory 22 during a period when the battery 18 is replaced.

Figure 2:
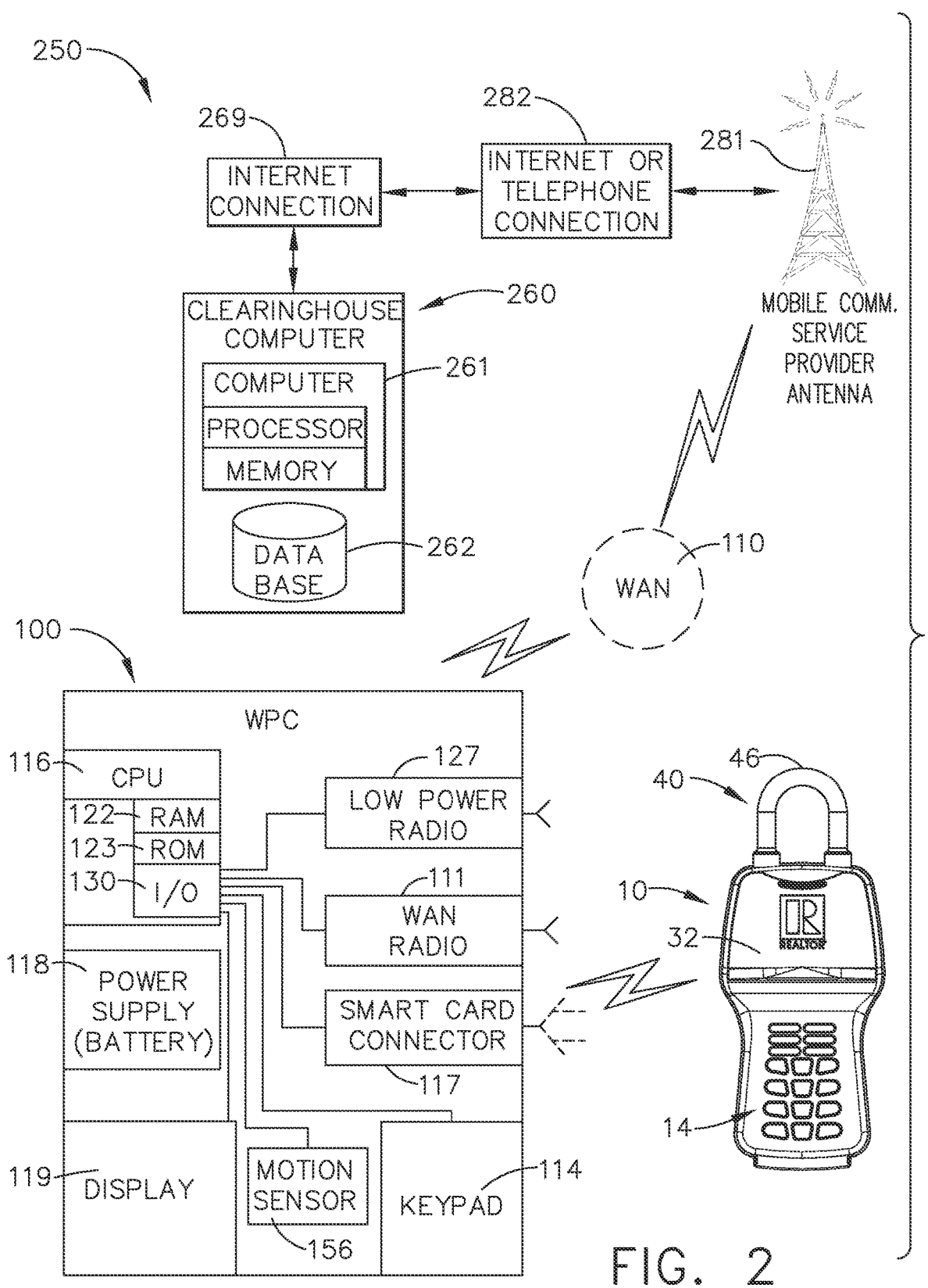
FIG. 2 is a diagrammatic view of the major components of a first embodiment of an electronic lockbox security system, including a central computer station, a wireless portable computer, and a portable electronic lockbox apparatus such as that depicted in FIG. 1.

Referring now to FIG. 2, a first embodiment electronic lockbox system, generally designated by the reference numeral 250, is depicted. The system 250 includes one or more electronic lockboxes 10, perhaps one or more secure memory cards (not shown on FIG. 2), wireless portable computer devices 100, a central computer system 260 (also sometimes referred to herein as a "CCC"), and a wireless data communications system, represented by Internet® connections 269 and 282, and a mobile phone provider 281. The central computer 260 typically will include a database 262 which contains a repository of electronic lockbox identification and attribute information, and also contains a repository of information about real estate agents. A computer 261 controls the database 262, and includes a processing circuit and a memory circuit (in addition to any bulk memory storage devices that contain the database 262).

Referring again to FIG. 2, an electronic lockbox system of a first embodiment is depicted in a diagrammatic view. An electronic lockbox 10 is depicted in the lower-right corner of FIG. 2, and is shown communicating to a wireless portable computer 100. As discussed above, wireless portable computer 100 includes a low power radio 127 that can communicate data to and from the low power radio 27 of the electronic lockbox 10. Some of the other components of the wireless portable computer 100 are depicted on FIG. 2.

In this embodiment, wireless portable computer 100 includes a microprocessor (CPU) 116, random access memory (RAM) 122, read only memory (ROM) 123, and an input/output interface circuit 130. There are several devices that are in communication with the input/output (I/O) circuit 130, as discussed immediately below.

The low power radio 127 communicates data to and from the CPU 116, via the I/O circuit 130. A wide area network (WAN) radio 111 is provided, and it also communicates data to and from the CPU 116, via the I/O interface circuit 130. Wireless portable computer 100 also includes a smart card connector 117, which is essentially identical to the smart card connector 17 that is provided on the electronic lockbox 10. Wireless portable computer 100 also includes a display 119, a keypad 114, a power supply 118 (typically a battery), and a motion sensor 156. The motion sensor 156 provides additional capability for the wireless portable computer 100, as discussed in greater detail below.

Because of its wide area network radio 111, wireless portable computer 100 is able to communicate to the clearinghouse computer 260 over a wide area network (WAN), which is generally designated by the reference numeral 110. Assuming that the mobile communications service provider 281 is a cellular telephone system, the wireless portable computer 100 will have the capability of essentially immediate communications with the clearinghouse computer 260 from many, many locations, including most locations where an electronic lockbox 10 has been situated. On the other hand, if a particular electronic lockbox 10 is located in a very remote area, where there is no cellular telephone connection coverage, then the wide area network 110 therefore would not reach that location, and the wireless portable computer 100 would not be in immediate communication with the clearinghouse computer 260.

The wide area network radio 111 further could comprise other types of wireless communications devices that may not operate on a strictly radio principle, including types of wireless communications devices that have not been invented as of yet. In this description, such wireless communications devices are sometimes referred to as "radios;" however, in this patent document they may also be referred to as a "wide area network wireless communications circuit," or as a "medium range wireless communications circuit."

In a preferred mode of the first embodiment depicted on FIG. 2, the wireless portable computer 100 includes a connector 117 that is capable of accepting a secure memory card (such as a "smart card"), so that a user who typically connects his or her secure memory card directly to an electronic lockbox 10 will also be able to connect the same secure memory card to the wireless portable computer 100, and have much the same results. This will be described in greater detail below. Note that the smart card connector can also be referred to as a "data interface" that communicates with a "secure memory device"—a "smart card" is an example of a secure memory device.

The first radio circuit of the wireless portable computer is the low power radio 127 such as Atmel's AT86RF23x series that uses a low power radio frequency signal. The wireless portable computer also includes a second radio circuit which is capable of longer range communications for wide area network connectivity, such as Wavecom's WISMO22x series. In a preferred embodiment, the CPU 116 will comprise a low power microcontroller, and a relatively low power visual display 119 will be provided to allow indication of operating status. The motion sensor 156 is to be included as an internal motion sensor that is coupled to the microcontroller (CPU 116). Its capability and use are described below.

The low power communications circuit in the lockbox (e.g. low power radio 27) provides sufficient range to enable proximal communications with a wireless portable computer 100 that is carried by the lockbox system user. The built-in wide area communication radio of the transponder (e.g., WAN radio 111), such as radios used by a cellular carrier, enables a host of other system features. One desirable feature of this arrangement is for individuals who access an electronic lockbox to be unencumbered with other devices. For example, real estate agents often have their hands full when approaching a lockbox, and such an agent that is equipped with a wireless portable computer 100 can enter a personal identification code on the keypad 114 of the wireless portable computer 100. It should be noted that the keypad 114 may also be referred to as a "data input circuit," in which a user (e.g., a sales "agent") may press one or more of the keys to enter data, such as numeric information.

Such an agent could initially use the wireless portable computer and its keypad while remaining in a vehicle, for example, and inserting their secure memory card into the connector 117 of the wireless portable computer 100. In this mode, the agent can prepare his or her wireless portable computer to be ready to communicate his or her personal identification code from the transponder 100 to the lockbox 10 over the low power radio link (between radios 127 and 27), and the electronic lockbox will interpret that radio signal to allow access to the key compartment door 32. In this manner, the lockbox radio system retrieves data from the wireless portable computer 100 to facilitate access to the dwelling key that is contained within the secure compartment of the electronic lockbox 10.

In another operating mode, a secure memory card that is connected to smart card connector 117 of the wireless portable computer 100 can have data read from the memory elements of the secure memory card 70 that is connected to the wireless portable computer 100, and have that data sent to the electronic lockbox over the low power radio link, thereby having the secure memory card's data "read" by the electronic lockbox CPU 16. Furthermore, if it is desirable to write data onto the memory elements 71 of a secure memory card 70, that function can occur while the secure memory card is connected to the smart card connector 117 of the wireless portable computer 100, by having the low power radio 27 of the electronic lockbox 10 transfer data to the wireless portable computer 100, and the CPU 116 can then write data onto the secure memory card, via the smart card connector 117. This could be accomplished to write the same types of data that would otherwise be written directly by the lockbox 10 to the secure memory card 70 as it is connected into the smart card connector 17 of the lockbox itself.

The use of secure memory cards offers many advantages with the electronic lockbox system for access to the lockbox, which is well documented in previous patents and patent applications filed by the same inventor of this patent document. To further enhance security, the lockbox can use data that the wireless portable computer 100 has retrieved over its wide area radio system (i.e., the WAN 110), such as the current (real time) decryption key for use with the secure memory card. If the wireless portable computer loses contact with the central computer system 260, or if the secure memory card is either lost or stolen, the decryption key update credentials of the wireless portable computer can be revoked at the central computer, thereby disabling further access to lockboxes by that secure memory card.

The electronic lockbox (either 10 or 800) will have the ability to store a software application program in its memory circuit 21, 23, 23 (or 821, 822, 823), and its processing circuit 16 (or 816) can execute the instructions of that software application program. The flow charts of FIGS. 10-12 describe some of the important features of such an application program.

Lockbox with Wireless Communications

Figure 4:
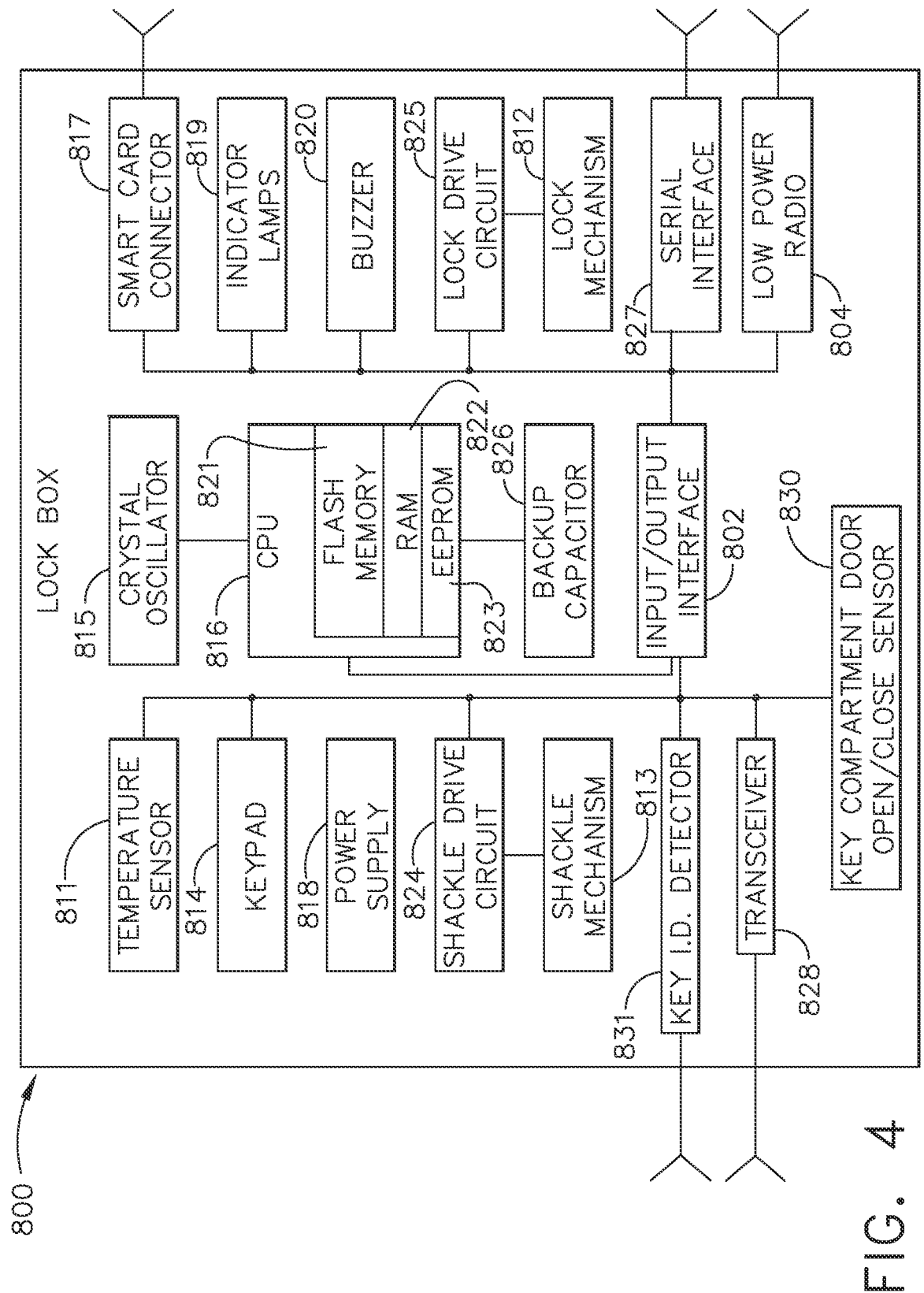
FIG. 4 is a block diagram showing some of the major hardware components of an electronic lockbox that communicates with a wireless portable electronic key, such as a "smart phone," and that also is able to communicate with an identification device, such as an RFID transceiver circuit, as constructed according to the principles of the technology disclosed herein.

An alternative lockbox design is provided in FIG. 4, which shows many of the major electronic components, generally designated by the reference numeral 800, in a block diagram. Most of the components listed in this block diagram are also found in the earlier versions of an electronic lockbox sold by SentriLock, LLC of Cincinnati, Ohio. A brief description of these components follows:

Electronic lockbox 800 includes a microprocessor (CPU) 816, FLASH memory 821, random access memory (RAM) 822, EEPROM (electrically erasable programmable read only memory) 823, a battery (or other electrical power supply) 818, a memory backup capacitor 826, an ISO-7816 smart card connector 817, indicator LED lamps 819, a piezo buzzer 820, a crystal oscillator 815, a digital temperature sensor 811 (these last two devices can be combined into a single chip) a shackle drive circuit 824, a shackle release mechanism 813, a key compartment mechanism drive circuit 825, a key compartment lock/release mechanism 812, and a membrane style keypad 814 for user data entry.

A serial interface 827 is also included so that the CPU 16 is able to communicate with other external devices, such as a separate portable computer in the form of a PDA (personal digital assistant) or other type of portable computing device that uses a serial data link. For example, serial interface 827 can comprise in infrared (IR) port that communicates with a standard IR port found on many PDA's; or it could use a different communications protocol, such as Bluetooth. A low power radio 804 is included for communications with a portable electronic key (not shown on FIG. 4). This radio 804 could have any number of types of communications protocols, including one that allows the lockbox 800 to exchange data with an electronic key in the form of a smart phone. A special software application program (an "APP") would run on the smart phone, to allow it to communicate with lockbox 800.

Microprocessor 816 controls the operation of the electronic lockbox 800 according to programmed instructions (electronic lockbox control software) stored in a memory device, such as in FLASH memory 821. RAM memory 822 is typically used to store various data elements such as counters, software variables and other informational data. EEPROM memory 823 is typically used to store more permanent electronic lockbox data such as serial number, configuration information, and other important data. It will be understood that many different types of microprocessors or microcontrollers could be used in the electronic lockbox 800, and that many different types of memory devices could be used to store data in both volatile and non-volatile form, without departing from the principles of this technology. In one mode of an exemplary embodiment, the electronic lockbox CPU 816 is an 8-bit Atmel Mega8 microcontroller that incorporates RAM 822, FLASH memory 821 and EEPROM memory 823 internally (as on-board memory).

Battery 818 provides the operating electrical power for the electronic lockbox. Capacitor 826 is used to provide temporary memory retention power during replacement of battery 818. It will be understood that an alternative electrical power supply could be used if desired, such as a solar panel with the memory backup capacitor.

An input/output (I/O) interface circuit 802 is provided so the microprocessor 816 can exchange data and operational signals with external devices, or with integral devices to the lockbox that require greater power than can be directly supplied by the microprocessor's pinouts. This puts the I/O circuit 802 in the pathway for virtually all signals that are used in the controlling of lockbox 800, including the data signals that are involved with the serial interface 827, the smart card connector 817, and the low power radio 804.

Electronic lockbox 800 generally includes a shackle (see item 946 on FIG. 5) that is typically used to attach the lockbox 800 to a door handle or other fixed object. However, it should be noted that stationary versions of these electronic lockboxes are now available that are permanently affixed to buildings, or other large object, and such stationary versions do not require shackles. One such stationary lockbox is illustrated in FIG. 6—see description below.

Figure 5:
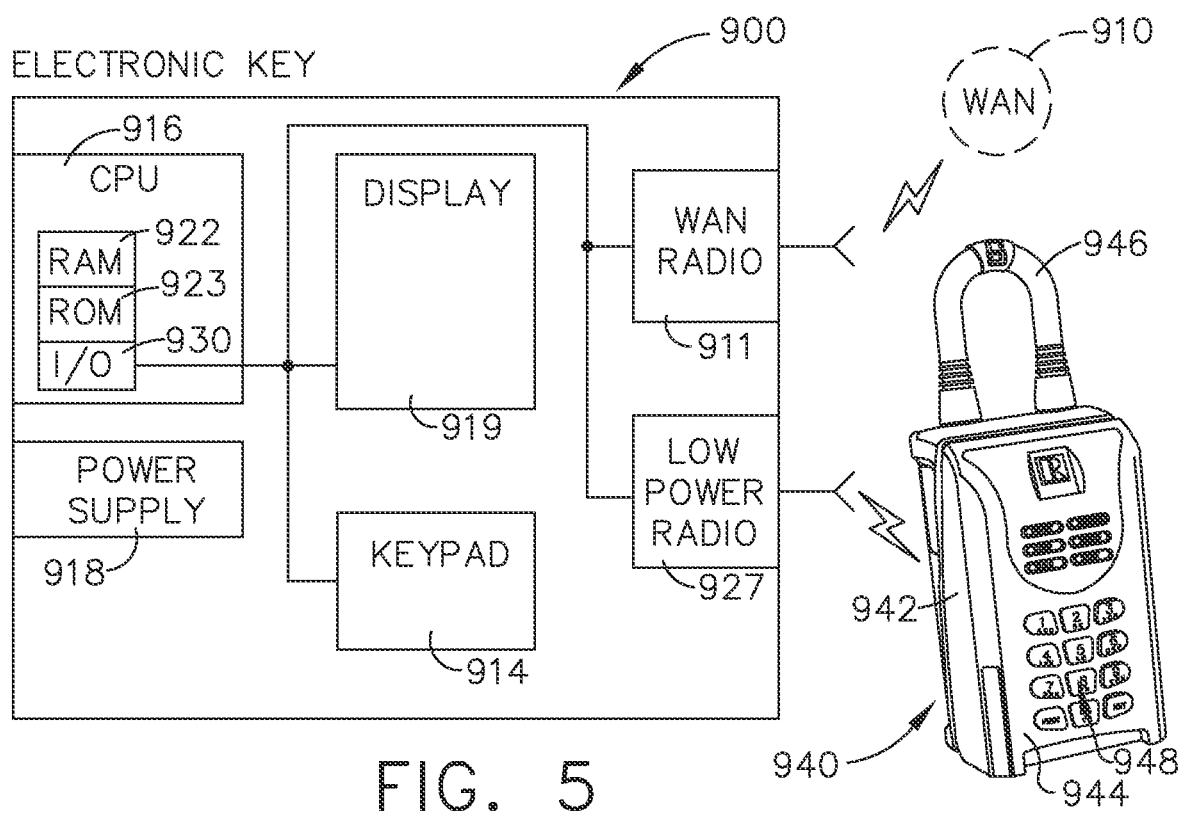
FIG. 5 is a block diagram showing some of the major hardware components of a portable electronic key that is capable of wireless communication with one of the electronic lockboxes of FIG. 1 or FIG. 4, for example, and that is capable of wireless communication with a wide area network, such as a cellular telephone system.
Figure 6:
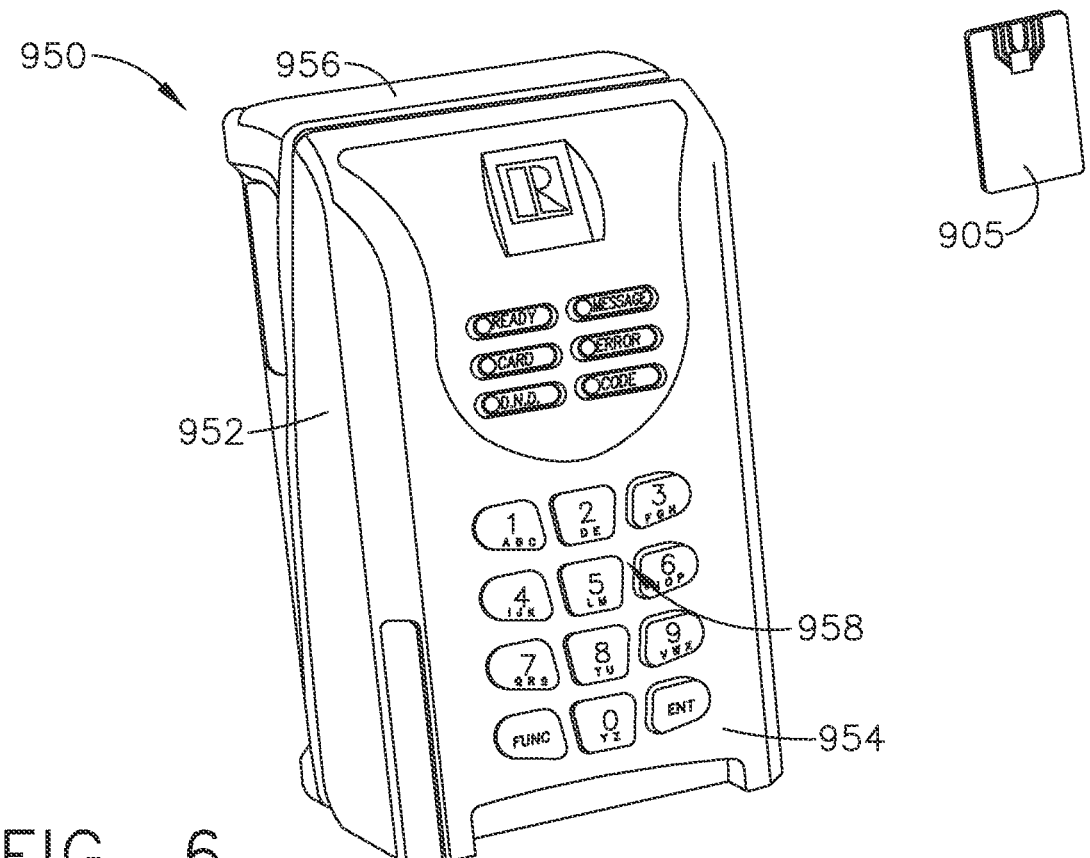
FIG. 6 is a perspective view of a stationary electronic lockbox, which includes the hardware components that are depicted in FIG. 1 or FIG. 4, for example.

Electronic lockbox 800 also includes a key compartment which typically holds a dwelling key (not shown), and which can be accessed via a key access door 32 (see FIG. 2), or a key access door 944 (see FIG. 5). Note that the structure called a "key access door" is also sometimes referred to herein as a "controlled access member." The key compartment's lock and release mechanism 812 uses a motor mechanism (not shown) that is controlled by drive circuit 825 that in turn is controlled by CPU 816. Shackle release mechanism 813 also uses a motor, which is controlled by drive circuit 824 that in turn is controlled by CPU 816. It will be understood that the release or locking mechanisms used for the shackle and key compartment can be constructed of many different types of mechanical or electromechanical devices without departing from the principles of the technology disclosed herein. It will also be understood that, in some physical locations, the lockbox may not require certain components that have been described above; for example, in some circumstances, a lockbox may not require a shackle, or it may not require a smart card reader.

The crystal oscillator 815 provides a steady or near-constant frequency (e.g., at 32.768 kHz) clock signal to CPU 816's asynchronous timer logic circuit. The ISO-7816 smart card connector 817 connects to smart card contacts to allow the exchange of data between the electronic lockbox's CPU 816 and the memory devices in the smart card. Note that, in today's more advanced lockboxes that are capable of wireless communications with an electronic key or a smart phone, the smart card connector 817 can become an optional feature, since it would be rarely used, if ever by most human users.

In one embodiment, the digital temperature sensor 811 is read at regular intervals by the electronic lockbox CPU 816 to determine the ambient temperature. Crystal oscillator 815 may exhibit a small change in oscillating characteristics as its ambient temperature changes. In one type of crystal oscillator device, the oscillation frequency drift follows a known parabolic curve around a 25 degrees C. center. The temperature measurements are used by CPU 16 in calculating the drift of crystal oscillator 815 and thus compensating for the drift and allowing precise timing measurement regardless of electronic lockbox operating environment temperature. As noted above, a single chip can be used to replace the combination of crystal oscillator 815 and temperature sensor 811, such as a part number DS32KHZ manufactured by Dallas Semiconductor.

LED indicator lamps 819 and a piezo buzzer 820 are included to provide both an audible and a visual feedback of operational status of the electronic lockbox 800. Their specific uses are described in detail in other patent documents by the same inventor. Backup capacitor 826 is charged by battery 818 (or perhaps by another power source) during normal operation.

The lockbox 800 can also be optionally equipped with a transceiver 828 that works with near field communications ("NFC") equipment, and perhaps could be used to detect RFID chips, for example. In addition, such NFC circuits may be used for communicating with many other electronic products that have become common at many commercial establishments; so much so that most new smart phones are equipped with such an NFC transceiver (which typically includes a low-power microcontroller circuit).

Electronic Key

Referring now to FIG. 5, a block diagram is provided for showing many of the major electronic components of an electronic key, generally designated by the reference numeral 900. Part of FIG. 5 also diagrammatically shows certain other system components, such as a wide area network 910 and an electronic lockbox 940. This particular lockbox includes a housing 942, a movable door 944 that covers a secure compartment beneath its surface, a shackle 946, and a keypad 948 for entering data via a human user. It should be noted that alternative lockbox designs are available that have no shackle whatsoever, and that have a different type of secure compartment in which at least a portion of the entire secure compartment is movable.

The electronic key 900 includes a microprocessor 916, which typically has on-board memory and interface components. On FIG. 5, the on-board memory circuit includes some RAM at 922, and ROM (or EEPROM) at 923. An input/output (I/O) interface circuit is depicted at 930. These on-board hardware components can be similar to those of the electronic lockbox, if desired. However, they are more likely to be part of a smart phone, which typically has very highly capable processing power and relatively large memory capacity.

Other hardware components of electronic key 900 include a power supply 918 (typically a battery), a display 919, a keypad 914 (which typically is part of a touch screen display, particularly if the electronic key is a smart phone and the display viewing area is large), a wide area network (WAN) radio circuit 911, and a low power radio circuit 927. The two radio circuits each have their own built-in antennas, as required for their broadcast and receive frequencies. The WAN radio 911 is designed to communicate with a wide area network, generally designated by the reference numeral 910; if electronic key 900 is a smart phone, for example, then the wide area network would generally be a cellular telephone network.

The low power radio circuit 927 is designed to communicate with one of the lockboxes of the overall security system. More specifically, the lower power radio 927 will exchange data messages with the low power radio circuit 804 of an electronic lockbox 800, as depicted on FIG. 4, or perhaps with the low power radio circuit 27 of an electronic lockbox 10, as depicted on FIG. 1. In the present technology disclosed herein, these low power radio circuits 927, 804, and perhaps 27, could comprise WiFi or Bluetooth technology, particularly if the electronic key 900 is a smart phone. Of course, other communication protocols could be utilized without departing from the principles of the technology disclosed herein. As noted above, a special APP would run on the smart phone (as the electronic key 900), to allow it to communicate with a lockbox 800. The electronic key can be in the form of a smart phone, as noted above, and it also is sometime referred herein to as a "wireless portable computer" (or "WPC").

It should be noted that the electronic lockbox 940 illustrated in FIG. 5 can also be accessed by use of a standard SentriLock smart card, such as the secure memory card depicted at 905 on FIG. 5. However, many of the features of the technology disclosed herein use the "instant" communications capabilities of an electronic key, including those in the form of a smart phone, for communicating both with a lockbox and with the central computer, in real time, or near-real time. Again, such devices can also be referred to as "wireless portable computers" (WPCs).

Another form of electronic lockbox is illustrated in FIG. 6. A stationary electronic lockbox is generally depicted at the reference numeral 950. Lockbox 950 has no shackle, and instead is designed to be permanently mounted to a building or other durable fixed structure, for lockbox security systems that can involve dwellings or other types of buildings used for human habitat, or for housing other items in which a protective secure access is desired. In this disclosure, lockboxes 940 and 950 will be said to contain a "dwelling key" in their secure compartments, whether the protected structure or physical area actually contains human occupants or not.

Lockbox 950 has similar structural elements as compared to lockbox 940. There is a housing 952, a movable door 954 that covers a secure compartment beneath its surface, and a keypad 958 for entering data via a human user. Lockbox 950 will include the same electronic components and control software as lockbox 940, sans the shackle latch members and the shackle itself. Lockbox 950 is designed to securely communicate with an electronic key 900 or with a smart card 905, just like lockbox 940.

Wireless Controller

Figure 3:
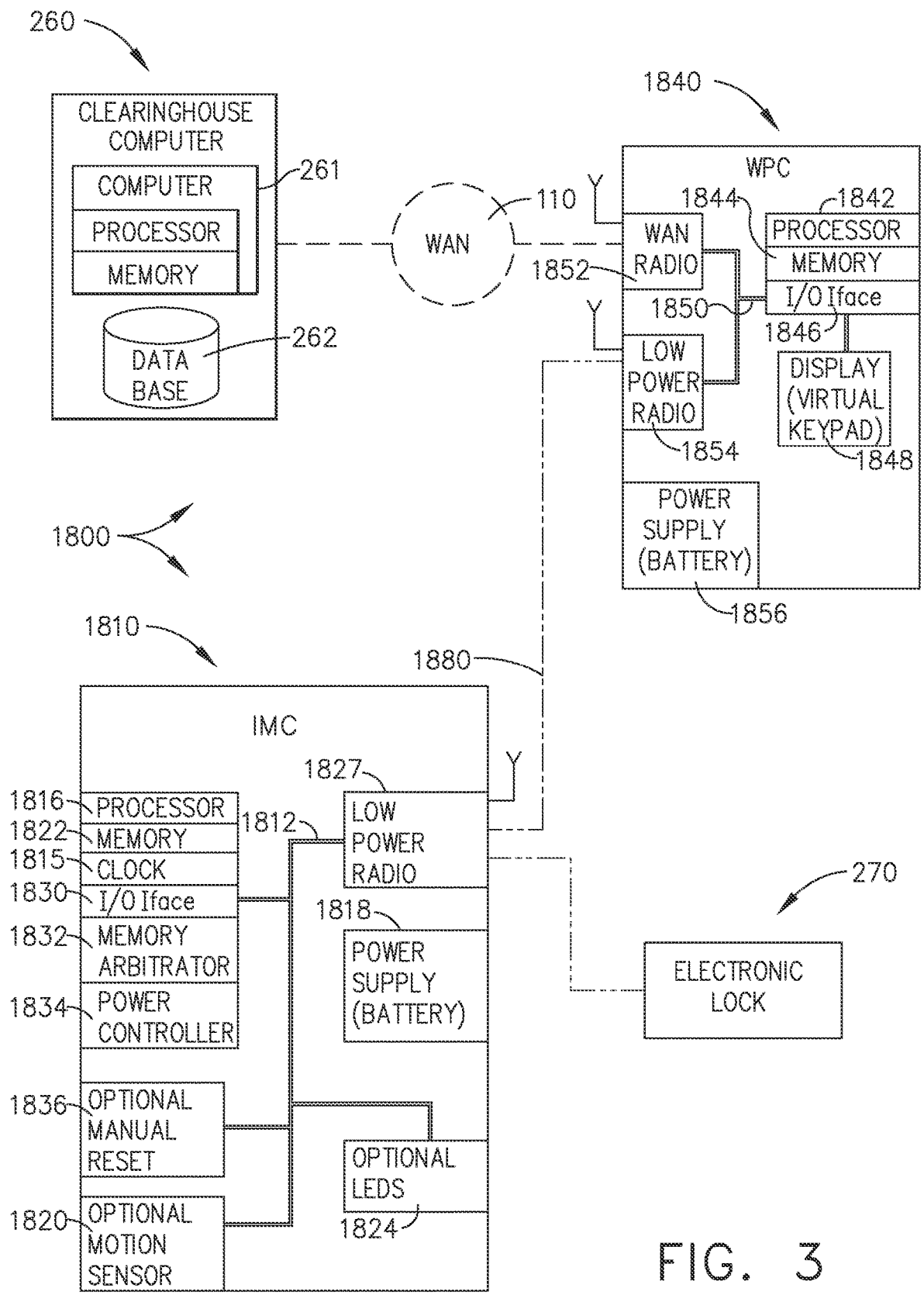
FIG. 3 is a diagrammatic view of the major components of a wireless controller that is also known as a "system on a chip" that can be used in some embodiments instead of using an electronic lockbox.

FIG. 3 illustrates another embodiment of an electronic locking system 1800 that includes the central computer 260, at least one wireless portable computer 1840, and at least one electronic wireless controller 1810 that act as an IMC.

The clearinghouse computer 260 includes a computer 261 with a processor and memory, and also includes a database 262 to hold access event data as well as a myriad of other types of information used by the electronic lockbox system. The wireless portable computer (WPC) 1840 includes a low power radio 1854 and a wide area network radio 1852. The IMC includes a low power radio 1827, which communicates with the WPC's low power radio 1854.

In FIG. 3, the wireless controller, generally referred to by the reference numeral 1810, is illustrated in block diagram form, for use in a security access control system. The wireless controller 1810 would typically contain a processing circuit 1816, a memory circuit 1822, a calendar-type clock circuit 1815, and some type of input/output interface circuit 1830. An interface or data bus 1812 would be used to communicate from the I/O interface circuit 1830 to the various input/output devices that are mounted on or included with the wireless controller 1810. A power supply 1818 would be included (which typically would be a battery), and a backup capacitor could be provided, if desired. The wireless controller 1810 also includes a low power radio 1827 (which could be a different type of wireless device than a radio, for example, an optical wireless communications device).

The wireless controller 1810 will have the ability to store a software application program in its memory circuit 1822, and its processing circuit 1816 can execute the instructions of that software application program. The flow charts of FIGS. 10-12 describe some of the important features of such an application program.

The wireless controller 1810 (as an IMC) would have many of the "controller" attributes of an electronic lockbox, but it would not, by itself, contain a physical key in a secure compartment, nor would it have a shackle for attachment to a doorknob on the remote site property. Instead, the wireless controller 1810 would mainly comprise an intelligent low power radio for communicating with a smart device, such as a smart phone, or other type of wireless portable computer (a WPC). Indeed, the wireless controller 1810 could be mounted inside a building, such as a dwelling, on the remote site property, where it would not be subject to tampering by illegal activities, and it would not be exposed to the weather.

Most, or all, of the electronic circuitry for the wireless controller 1810 can be implemented in a commercially-available device known as a "system-on-chip." Texas Instruments sells such a device under the model number CC2541, for example. As noted above, the wireless controller 1810 contains circuits such as the processing circuit 1816, memory circuit 1822, calendar-type clock circuit 1815, and input/output interface circuit 1830. In addition, the exemplary wireless controller 1810 contains a memory arbitrator (or "arbiter") circuit 1832, a power management controller circuit 1834, and a low power radio circuit 1827, as well as numerous other circuits provided by Texas Instruments to provide the processing and interface capabilities of a device referred to by many as a "system on a chip." Specifically, the radio circuit 1827 can work with the low energy 2.4 GHz Bluetooth protocol.

The Texas Instruments CC2541 device uses three different power modes: (1) 4-microsecond Wake-up, (2) Sleep Timer On, and (3) External Interrupts. As portions of its memory circuit 1822, it includes In-System-Programmable Flash memory, 128-KB or 256-KB, and 8-KB RAM with retention in all power modes. For use with input/output signals (for the I/O interface circuit 1830), it includes a multiplexed 12-Bit ADC, multiple timer circuits, and multiple serial interfaces (USART circuits). TI also makes other similar "system-on-chip" devices (e.g., the CC2540) that could be used, as an alternative, as the heart of the wireless controller 1810.

In addition to the TI device, the wireless controller 1810 can optionally be provided with certain input or output devices to make the wireless controller more user-friendly, or to make it easier to troubleshoot. For example, a manual reset switch 1836 could be included, and/or some type of indicator light (e.g., using an LED) could be included to provide status information, if desired by the systems designer. A motion sensor could be included, to provide an indication of tampering, for example.

It should be noted that the overall physical package for the wireless controller 1810 could be quite small, such as a flat-pack plastic case that might be only about two inches square, or smaller. The smaller the unit packaging, then perhaps the less optional features that might be included. But even with such a small two-inch by two-inch package (or smaller), the battery would be able to support the TI device for over one year, at a wake-up cycle rate of one second to send a polling signal, such as a Bluetooth advertising packet as a short signal burst, for example.

If some of the optional features, such as a manual reset switch 1836 or status indicating lights 1824, are included in the wireless controller package, then the overall package size could be increased, if necessary. However, such optional features are themselves available in quite small devices, so the overall package size might not need to increase at all.

The WPC 1840 would include a processing circuit 1842, a memory circuit 1844, and an input/output interface circuit 1846, as well as a display 1848. One typical WPC that could be used would be a smart phone, and most smart phones have a touch screen display, which can act as a virtual keypad. Some type of user input device will be necessary, so if a virtual keypad is not part of the display 1848, then some other type of input keypad or at least a numeric keypad (such as a telephone keypad) would be needed. The WPC 1840 will also have a signal or data bus 1850 that transfers signals from the I/O interface 1846 to a wide area network radio 1852, and a low power radio 1854. The WPC would also contain some type of electrical power supply 1856, such as a battery. As with most modern smart phones, the WPC 1840 will have the ability to receive and store an application program (an APP) in its memory circuit 1844, and its processing circuit 1842 can execute the instructions of that APP. The flow charts of FIGS. 10-12 describe some of the important features of such an APP.

The WPC can communicate with the wireless controller 1810, using a communication pathway 1880. This "pathway" is not a hardware pathway, but comprises some type of wireless communication protocol, such as Bluetooth or Zigbee.

When using a wireless controller such as that depicted on FIG. 3, a "regular" electronic lockbox would not be needed to protect the remote property. Instead, some other locking device could be used, as discussed below.

The wireless controller 1810 (as an IMC) is able to work as an intelligent wireless transceiver, and it could be programmed to send a periodic polling message that would be received by a user's WPC when the WPC came within range of the low power radio signal being transmitted by low power radio 1827. This reception would occur naturally, as the user approaches the property at the remote site, where the wireless controller 1810 had been pre-positioned (much like an electronic lockbox that has been previously shackled to a doorknob of a building at a remote property site). Once the user's WPC receives the polling message (e.g., a Bluetooth advertisement packet), the WPC would send an appropriate response message using its lower power radio, under the control of an APP that was previously installed on the WPC. The wireless controller 1810 (the IMC) will analyze the response message content, and if correct for that interval of epoch time (for that particular real estate board, for example), the wireless controller would then transmit an encrypted message back to the WPC.

Figure 7:
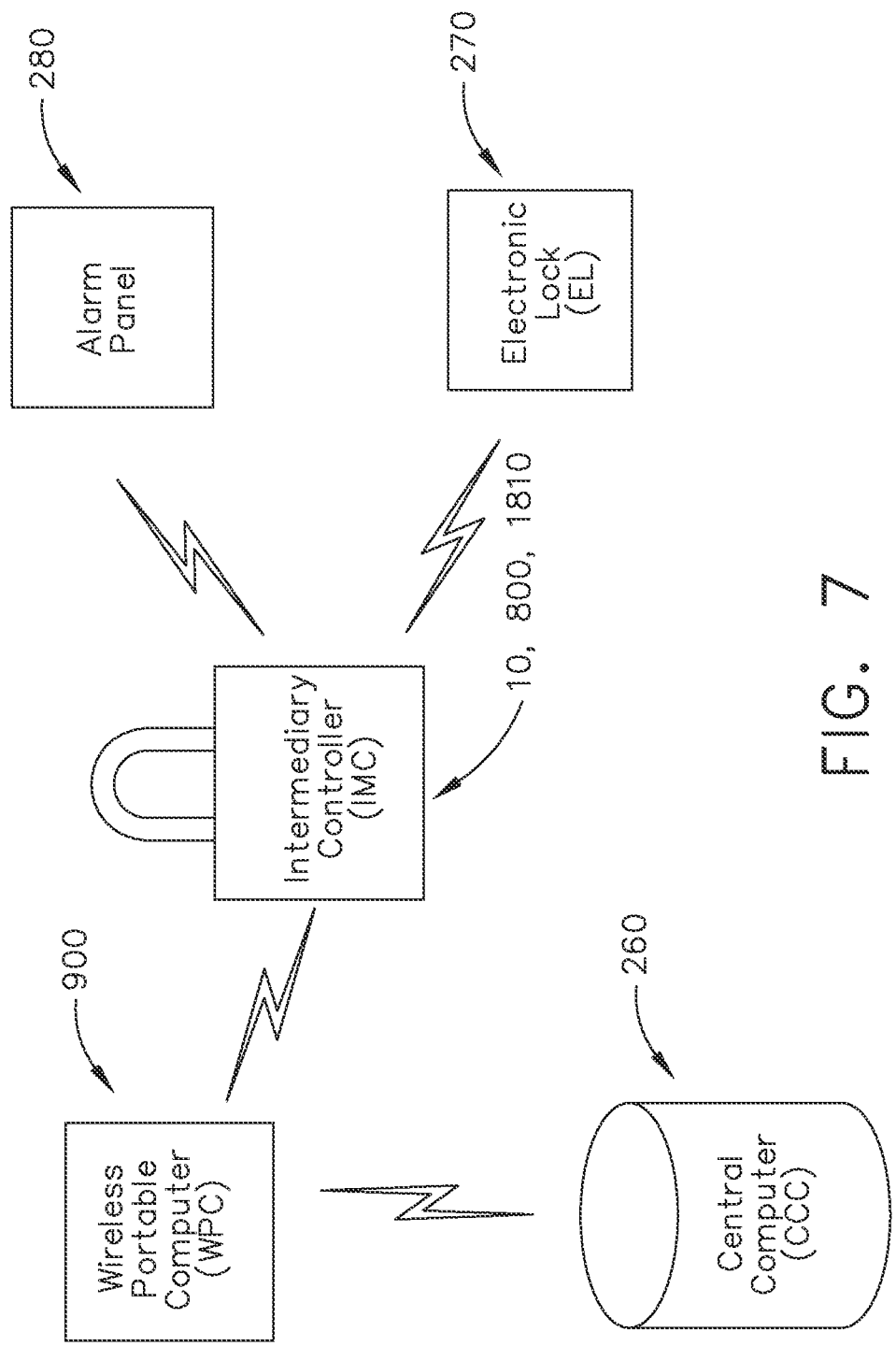
FIG. 7 is a block diagram of an overview of a system that includes a central computer, a wireless portable computer, and at least one electronic lock, as used in a system according to the principles of the technology disclosed herein.

Referring now to FIG. 7, a "standard" system for use with the present technology is illustrated in block diagram form. The wireless portable computer 900 is normally carried by a person having administrative privileges with respect to an intermediary controller, such as a lockbox or a first electronic lock (which is generally designated by the reference numeral 10 or 800) or a wireless controller 1810. That person with administrative privileges will often be referred to herein as the "the ADMIN." As discussed above, the wireless portable computer (or "WPC") is typically a smart phone, and it has a low power radio to talk to an intermediary controller (e.g., an electronic lockbox 10 or 800, or a wireless controller 1810), and the WPC will typically also have a high power or long range radio that can talk to a cellular tower, and eventually communicate with a central computer 260.

The central computer 260 will be a relatively large computing center that can handle dozens if not hundreds of communications with various users simultaneously, and which will contain a CPU (a computer or processor unit), a memory circuit, and other equipment that allows it to communicate over the Internet and eventually through cellular communications equipment. The memory circuit of the central computer 260 will include a database of lockboxes and other types of electronic locks, as well as dwelling or other building installations. The types of data that can be stored in the database of the central computer is almost infinite.

The intermediary controller (also known as "the IMC") is able to communicate with an electronic lock (the "the EL") that is generally designated by the reference numeral 270. The IMC is also able to communicate to an alarm panel generally designated by the reference numeral 280, which is an optional piece of equipment often found in buildings or dwellings.

As noted above, the person designated as the ADMIN is a person that has administrative privileges for the IMC, and that person typically would be either a human owner of that controller, or an organization that owns multiple such controllers, and places them at various installations in a computerized system. Another person that has privileges to access the IMC will be referred to herein as the "the USER," and the USER is quite often a different human being than the ADMIN (if the ADMIN is a human being rather than an organization). This is a common situation, particularly in real estate sales situations, in which the ADMIN could be the "listing agent" who owns a lockbox or other type of electronic lock (i.e., the IMC), and the USER is known as the "showing agent" who comes to the site to show a dwelling (or other type of building) to a sales prospect.

Another important person or organization will be referred to herein as the "MANAGER," and it is this person or organization who controls the electronic lock (the EL) 270 and/or the alarm panel 280. An example of a MANAGER is a home owner or a human occupant of a home. Of course, other types of buildings can be used in this overall security system, and in fact the MANAGER can be an organization that owns multiple electronic locks and multiple buildings or dwellings, and these buildings may not be for sale or be involved in any kind of sales transaction at all. For example, the buildings could be dwellings for persons who are retired or live in a retirement community that has some type of health care concerns for the occupants, and the USER may not be any type of sales agent, but may be a medical caregiver, for example. Such a caregiver may be involved with either acquiring or providing medical care information for one of the human occupants within the dwelling, for example, or may be there to actually dispense some medicines, for example.

The MANAGER may be a human being who happens to be the home owner of a dwelling, instead of being someone that is part of a large organization. In any event, the MANAGER is either a person or an organization that has information that is necessary for accessing the electronic lock (the EL) 270. For typical electronic locks used in homes, there will be access codes, which could be described as "security codes." Each brand of electronic lock and each model number of such a brand will have certain communications protocols that need to be observed, or the electronic lock 270 will not be able to communicate with some other external device (such as the IMC). Therefore, the MANAGER must be able to provide those necessary codes and protocols to a person that will be installing the controller (the IMC) 10 or 800 (if it is a lockbox). Those security codes and protocols of the equipment for the EL are necessary so the system can be initially set up when the controller (the IMC) is installed and first made to communicate with the electronic lock 270. Furthermore, if the building (such as a dwelling) does indeed have an alarm system, then the alarm panel 280 must also be communicated with, either by the EL or by the IMC. If it is desired for the lockbox (the IMC) to communicate directly with the alarm panel 280, then again there will be some type of security codes and communications protocols that need to be observed, and the MANAGER will need to provide that information to the ADMIN, so that the ADMIN can install and setup the lockbox or the IMC during initial installation.

Once the security codes and protocols for a given installation have been provided from the MANAGER to the ADMIN, the ADMIN will see to it that this important information is provided to the central computer 260. The database of that central computer will then store those protocols and access codes relating to the EL, and also for an alarm panel if one will be on that site. That information will be made available to a USER who later comes to the site of the building or dwelling so as to obtain access to that building or dwelling that is protected by the electronic lock (the EL) 270 and/or the alarm panel 280.

On-Site Setup

Figure 10:
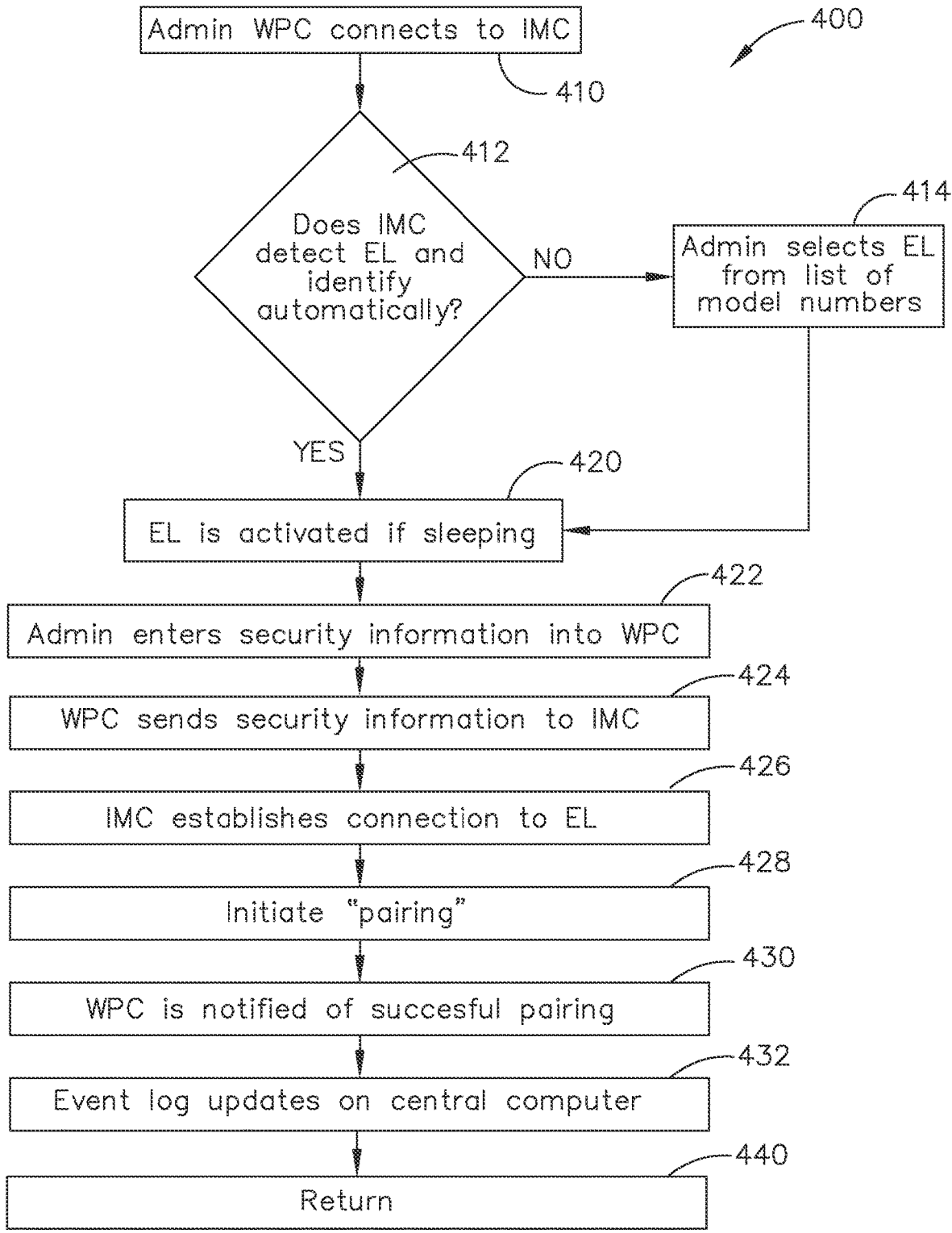
FIG. 10 is a flow chart of some of the steps executed during a setup procedure, as part of the control logic for the technology disclosed herein.

Referring now to FIG. 10, a flow chart is provided showing some of the important steps to set up a controller (the IMC) 10 or 800, or some other type of electronic device that will act as the IMC. In this flow chart, which is generally designated by the reference numeral 400, it is assumed that the ADMIN has already obtained the important information such as the access codes and communications protocols of the EL, and/or an alarm panel 280 that is on the site of a particular building or dwelling; that information would have come from the MANAGER of that building or dwelling. Those codes and protocols should have already been stored in the central computer database, as noted above; furthermore, that information will be downloaded from the central computer 260 to the wireless portable computer 900 that is being carried by this particular the ADMIN human being.

In flow chart 400, the first step at 410 is for the ADMIN WPC to connect to the IMC, which could be a lockbox, or some other type of electronic lock that does not necessarily contain a mechanical key, or perhaps some type of wireless controller that is also a "system on a chip." The detailed procedure for making this connection between the WPC and the IMC as a lockbox is well-known, and has been disclosed in earlier patent applications owned by SentriLock, LLC, which have been incorporated by reference herein. More specifically, the IMC will require the appropriate credentials from the ADMIN WPC before allowing further steps in this routine to take place. If, for example, the ADMIN WPC credentials that are presented to the IMC are not deemed to be valid, then an error condition will arise, and that error condition will be reported to the central computer (the CCC), and then stored in an event log of that CCC's database.

On the other hand, if the ADMIN WPC credentials that are presented to the IMC are deemed to be valid, then the WPC and the IMC will begin an appropriate communications session (also sometimes referred to as "pairing"). Once the WPC and the IMC have been paired (using terminology from Bluetooth communications protocols, for example), a decision step 412 determines whether the IMC (or the WPC) detects the electronic lock at this site (referred to as the EL). In addition, this decision step 412 also determines whether or not the IMC (or the WPC) can automatically identify the EL. If the answer is NO, then a step 414 is performed in which the ADMIN must select the correct manufacturer and model number of this specific EL from a list of model numbers that are available in the system. Once that has been accomplished, the logic flow is directed to a step 420.

If the pairing and identification has been made automatically at decision step 412, then the logic flow is directed to step 420 automatically, and at that step, the EL becomes activated (if it was sleeping). Once the EL is activated, the ADMIN enters security information into his or her WPC at a step 422. This information is part of the pairing procedure between the EL and either the IMC or the WPC, and must be entered "live" in many, if not most, communications pairing procedures between electronic locks. Perhaps that procedure could be automated, in which the data is already stored in the memory of the WPC, but still the application program would have to find a way of finding the correct memory cell to get access to those codes.

The pairing of credentials between the IMC and the EL will create a trusted relationship between those two electronic devices. The information necessary to create this trusted relationship will typically include permissions and passcodes that are required by the dwelling/building protective electronic lock, known as the EL in this description. In essence, the EL validates the security information that is contained in the credentials being provided by the IMC and the WPC. The communications protocols can be low power radio communications, such as those used by the Bluetooth or Zigbee protocols. Once the trusted relationship between the IMC and the EL comes into existence, those two devices will be able to continue exchanging data communications without a further pairing procedure, until this data exchange session has been completed.

The WPC will need to be provided with a special computer program, typically known as an APP, so that it can communicate with the IMC device. The IMC device (such as a lockbox) will also need to run an emulation program that enables it to communicate with the EL. The APP running on the wireless portable computer will need to be able to accept the user code and to store and use the exact communications protocols that will work with each model number and brand of the electronic lock (the EL) that is protecting the dwelling or building. If a new style of electronic lock is encountered at time of setup, then those communications protocols and/or security codes (such as a password) will need to be provided by the MANAGER to the ADMIN (or to a web portal usable by the central computer and/or accessible by the ADMIN), and that information will need to be entered properly into the application software for the IMC device (such as a lockbox). It should be noted that when most electronic locks used in dwellings are installed, if they use a protocol such as Bluetooth, that electronic lock (the EL) typically will advertise and provide that brand's model number and the brand name itself as part of that advertisement. In some models and brands of such electronic locks, even the lock's serial number might be communicated as the electronic lock advertises. This information can be then used by the other end of the pairing, and in this case, it would be used by the IMC or by the WPC.

The WPC now sends that security information (e.g., the EL protocol information and perhaps also the user code, or codes) to the IMC at a step 424. The IMC now establishes a connection to the EL at a step 426. Two of these devices (one being the EL, and the other being either the IMS or the WPC) now initiate pairing at a step 428. If the security information is validated by the EL during the pairing, that means the user code and communications protocol information was correct at the EL. Both the IMC and the WPC are notified of the successful pairing and EL validation at a step 430, by at least one message originating at the EL. In addition, at step 430 the IMC stores the specific security information in its first memory circuit 822 (or 1822), for later use by another authorized user (such as a real estate "showing agent") who arrive at this property and desire to obtain access via the EL. An event log is now updated on the central computer at step 432, based on a message sent by the WPC. Note that, of course, there must be some type of cell phone communications between the WPC of the ADMIN and that central computer, either in real time, or a delayed communication that will occur later once the WPC enters an active cell. This setup procedure is now finished, and the application now returns to other functions at a step 440.

Figure 8:
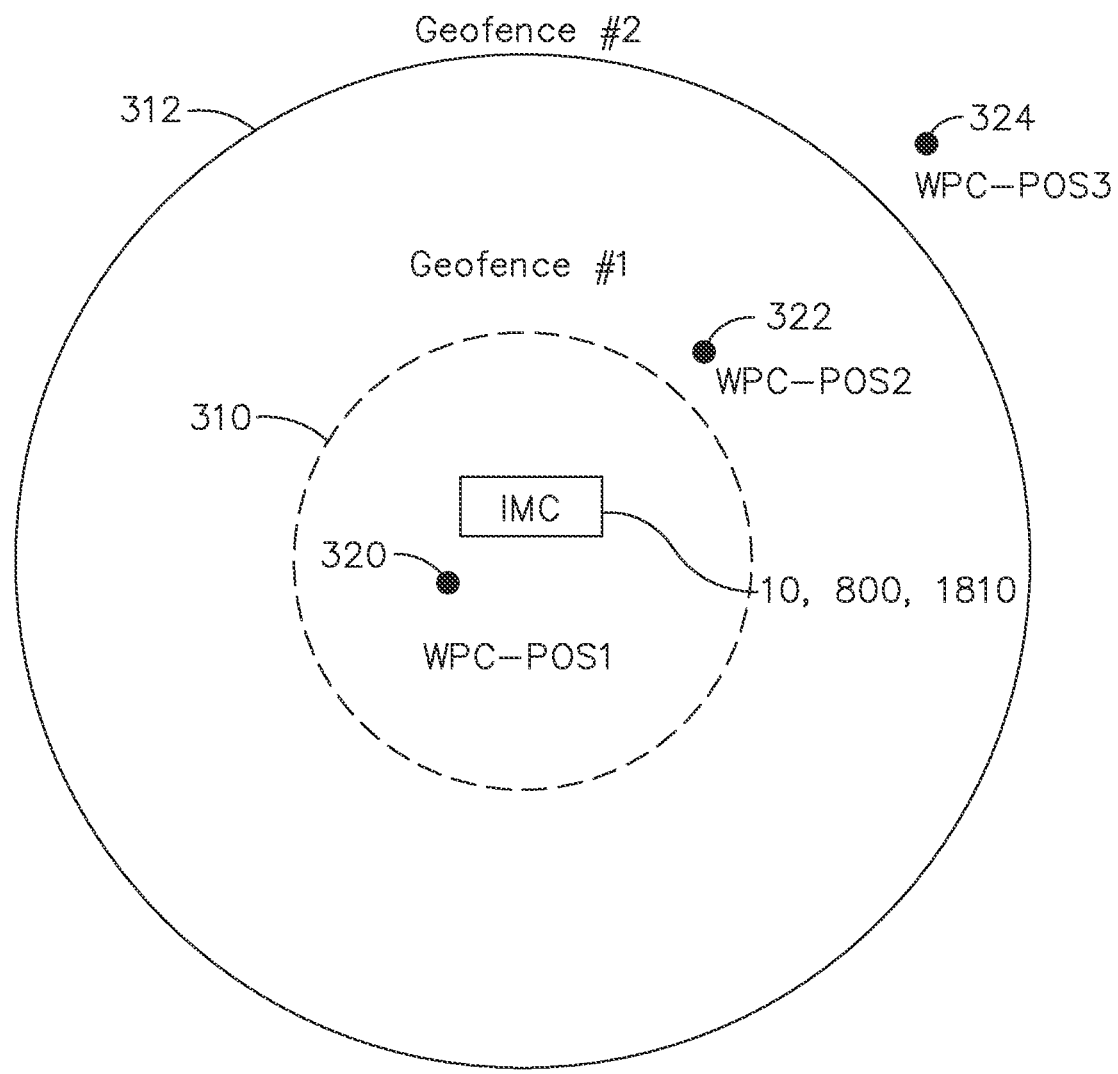
FIG. 8 is a diagrammatic view showing a typical installation of a lockbox or other type of electronic lock which uses two concentric geofences, and used in the system of FIG. 7.

Now that the setup procedure has been accomplished as per the flowchart 400, the two electronic devices the IMC and the EL for a given site are now ready for access by a valid USER. Before describing that access, a physical description of this type of site will be described in reference to FIG. 8. In FIG. 8, an IMC (such as a lockbox 10 or 800, or a wireless controller 1810) has been installed at the center of a geofence, or in this instance, at the center of two different geofences that are concentric. The first geofence is generally designated by the reference numeral 310, and the second, larger geofence is generally designated by the reference numeral 312.

If the wireless portable computer is currently located at a first position near the IMC, as depicted at the reference numeral 320, then that typically means the USER (who is carrying that WPC) is within both geofences 310 and 312. On FIG. 8, a USER who has moved to a second position at reference numeral 322 is considered outside the first geofence 310, but still inside the second geofence 312. This means that the wireless portable computer is now "outside" the first geofence 310, which can be strictly a GPS coordinate-generated geofence. When the WPC is located at the position 320, diagrammatically the WPC is right at the IMC (e.g., an electronic lockbox). Those GPS coordinates can be determined by the GPS receiver on the WPC (which can be a smart phone that, in today's technology, typically has a GPS receiver). As the WPC is moved around the site of the dwelling or building being visited by the USER, then the WPC will eventually travel to a location outside the first geofence 310. The GPS coordinates at position two (at the reference numeral 322) will be determined by the WPC itself, and it will figure out that it is outside that geofence 310.

If the WPC is then moved farther away from the lockbox (the IMC), and goes outside the second geofence 312, that could be considered a third position, such as that indicated by the reference numeral 324. In this example, the second geofence 312 is the outer limit of communications range between the low power radios carried by the WPC and used by the lockbox (the IMC). This is a physical parameter that cannot realistically be changed by any type of data or other circuit changing components, unless such changes of circuits would be done to both the lockbox (the IMC) and the wireless portable computer (WPC) itself. Realistically, there is no point in trying to extend the range for the second geofence 312, because there is typically plenty of range capability when using Bluetooth or other type of WiFi types of communications techniques. What is important is that the distance from the center of geofence 312 is greater than the distance from the center of geofence 310. Otherwise, the WPC would run out of communications capabilities to and from the IMC before knowing it had passed beyond the GPS geofence. That would create an ambiguous situation, and the logic that will be discussed below would not work properly.

Figure 9:
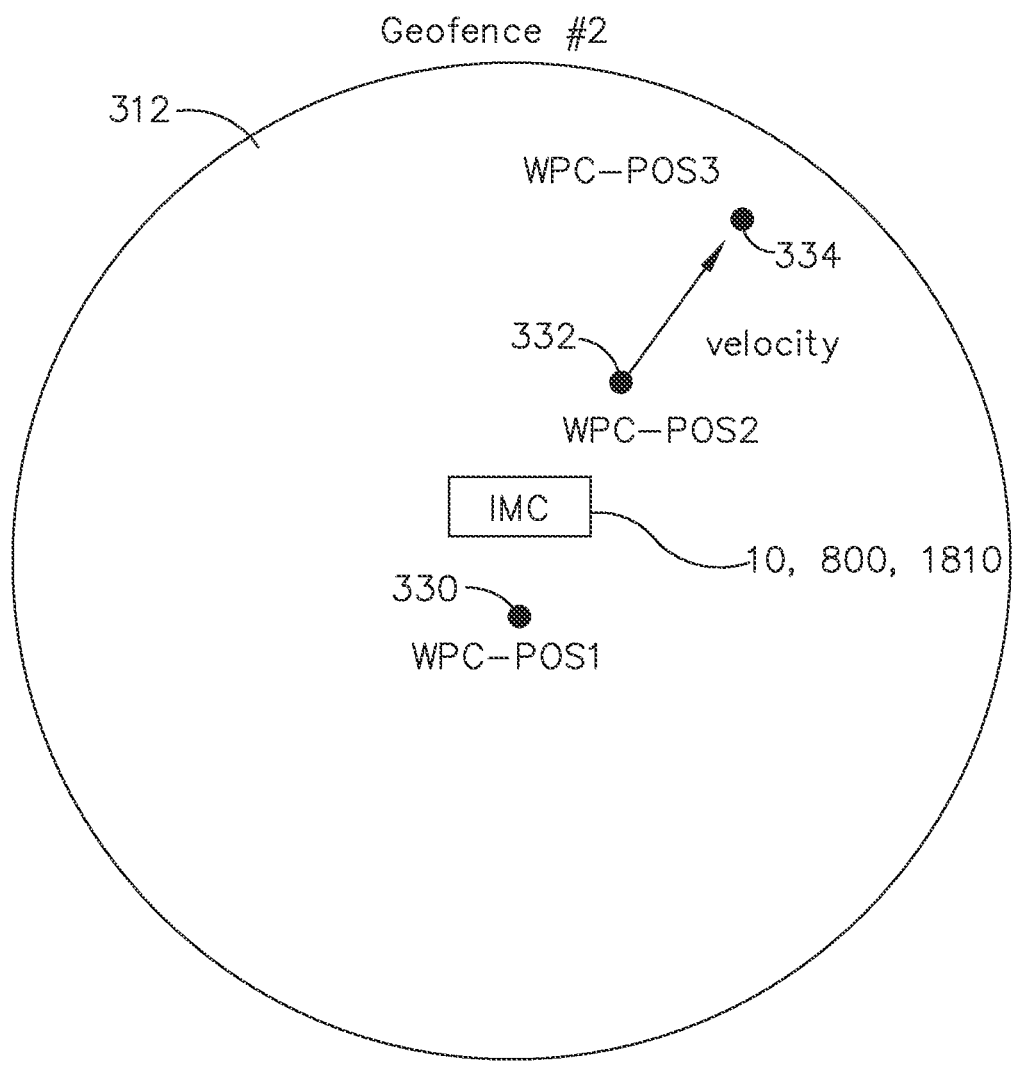
FIG. 9 is a diagrammatic view showing a typical installation of a lockbox or other type of electronic lock which uses one concentric geofence, and used in the system of FIG. 7.

Referring now to FIG. 9, there is only a single geofence 312 in this example. Once again, geofence 312 is a physical parameter that is determined by the actual communications range capabilities between the Bluetooth or other type of WiFi communications circuits being used by the IMC and the low power communications radio of the WPC. In FIG.

9, the WPC begins at a first position that is generally designated by the reference numeral 330. The human USER can move to a second position while carrying the WPC, and that second position is generally designated by the reference numeral 332. Later, the human USER can move the WPC to a third position at the reference numeral 334. Since time is being measured by the WPC (real time is always tracked on a typical smart phone), the velocity can be determined between the second and third points at 332 and 334, respectively. If the velocity is greater than a certain threshold value, it can be assumed that the USER and the WPC are now travelling in some type of vehicle, which means that the showing (in a real estate situation) is now over. This will be discussed in greater detail below.

It will be understood that the electronic lock 270 (the "EL") is typically used to protect a specific property. Such an electronic lock inherently includes several electronic components, such as a processing circuit and a memory circuit that including instructions which are executable by the EL's processing circuit. Those individual circuits are not shown on the drawings, but they must exist for the EL to actually perform as an electronic lock. In addition, for the purposes of the technology disclosed herein, the EL 270 also includes a short range wireless communications circuit so as to be able to exchange data with the IMC 10, 800, or 1810 (or perhaps with the WPC), and further includes a physical lock that is under the control of its processing circuit.

It will also be understood that the alarm panel 280 is typically an optional piece of equipment for a given property, and it can be installed with, or without, a corresponding electronic lock at the same property. Such an alarm panel inherently includes several electronic components, such as a processing circuit and a memory circuit that including instructions which are executable by the alarm panel's processing circuit. Those individual circuits are not shown on the drawings, but they must exist for the alarm panel to actually be able to perform its functions. In addition, for the purposes of the technology disclosed herein, the alarm panel 280 also includes a short range wireless communications circuit so as to be able to exchange data with the IMC 10, 800, or 1810 (or perhaps with the WPC). Further, most alarm panels include a user-operated keypad, either in the form of a hardware keypad or as a virtual keypad that is part of a touchscreen display.

Operation/Access

Figure 11:
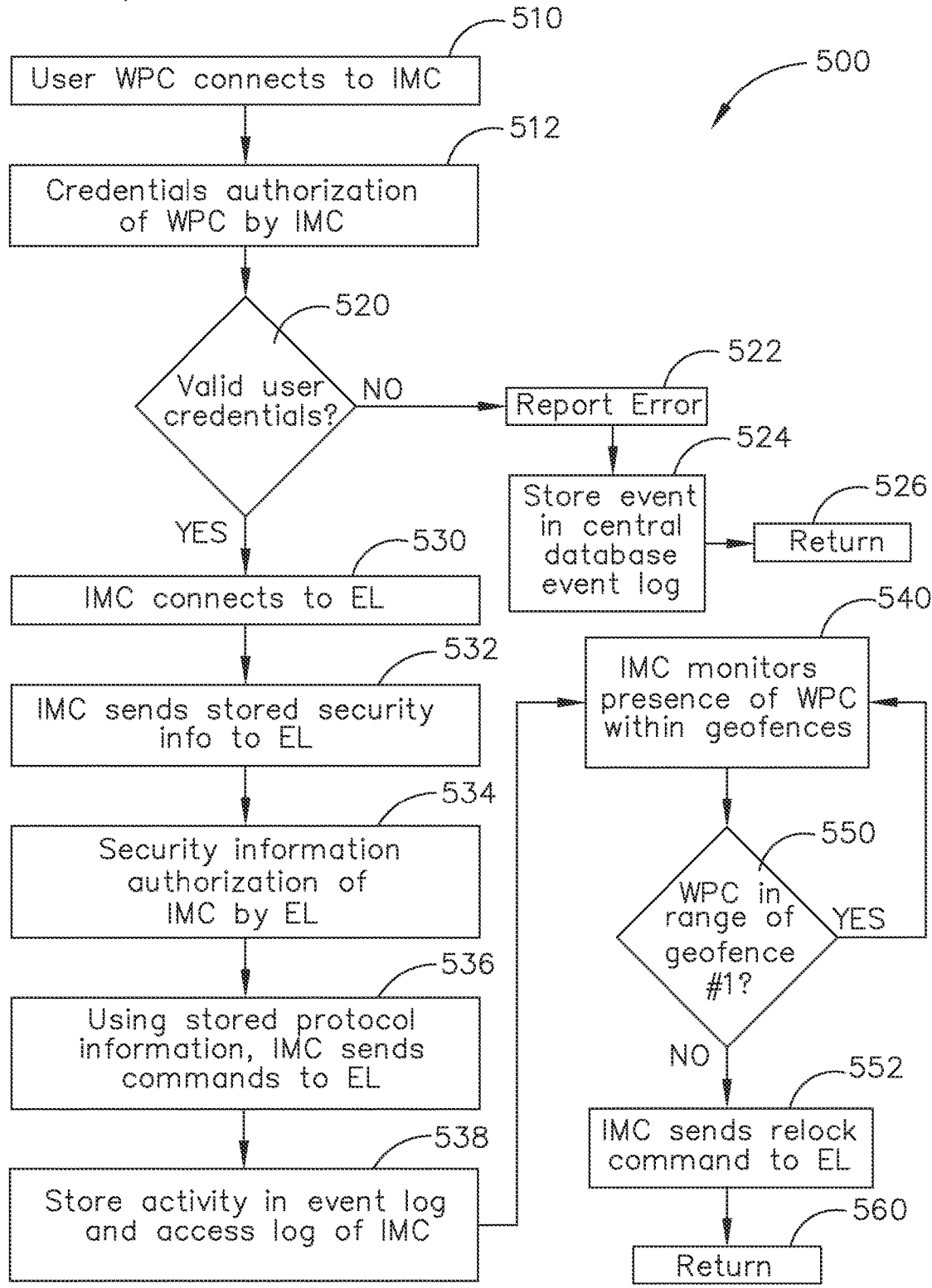
FIG. 11 is a flow chart of some of the steps executed during accessing an electronic lock, as part of the control logic for the technology disclosed herein, in which an automatic relock command is sent to one of the electronic locks based on geofence parameters.

Referring now to FIG. 11, a flow chart is provided showing some of the important operational steps used when a USER arrives at a site to obtain access to a building or dwelling. The flow chart is generally designated by the reference numeral 500, and begins at a step 510 with the USER WPC connecting to the IMC, which can be a lockbox or other type of electronic lock or (wireless) electronic controller. The IMC now must authorize the credentials of the WPC, and that is carried out in a step 512. A decision step 520 now determines whether or not the USER credentials are valid. If not, then the logic flow is directed to a step 522 which reports an error condition, and that error event is stored in the central computer's database event log at a step 524. That event sequence would be the end of this flow chart, and the application returns to other computer operations at a step 526.

On the other hand, if a USER's credentials have been properly validated at decision step 520, then the logic flow is directed to a step 530 where the IMC (or the WPC) connects to the electronic lock (the EL). After that occurs the IMC (or the WPC) sends stored security information to the EL at a step 532. That security information is then analyzed and authorized by the EL at a step 534; in general, the result of this is that the IMC (or the WPC) now becomes "trusted" by the EL.

It should be noted that, so long as there has been no component failure and no garbled communications messages, the above security authorization of the IMC by the EL in step 534 should always succeed, since the IMC was previously set up with the proper "lock security code" and the proper "lock protocol" information (i.e., the appropriate format of data that is expected by the EL) for that exact EL, as per the flow chart 400. This is one of the chief advantages of this access control system: the USER need not know anything about how to operate the EL of this particular dwelling/building. The USER only needs to know how to authenticate himself/herself to the IMC, and access to the dwelling/building is virtually guaranteed, so long as that setup procedure was correctly done. Of course, if the MANAGER (a homeowner, for example) manually changes the correct security code on the EL, then everything derails, and a new setup procedure would have to be performed.

The next step at 536 allows the IMC (or the WPC) to send commands to the EL, using stored protocol information. (Such commands will be obeyed by the EL, since the IMC (or the WPC) has now become a "trusted" device.) This activity is now stored in both an event log and an access log of the IMC, at a step 538. At this point, the EL has been unlocked, and the USER will now be allowed to obtain access to the building or dwelling, and may enter the interior spaces of such building/dwelling. As noted above regarding step 536, the IMC (or the WPC) is allowed to send commands to the EL, and typically the first command will be to unlock the EL electronic lock. Later, after the purposes of the visit have been accomplished, the USER can manually send another command from the IMC (or the WPC) to the EL, and that second command could be to relock the electronic lock EL. However, the USER is a human being, and may forget to send that second command, which means that the electronic lock EL would have been left in its unlocked state. This can be handled in various ways, as discussed below.

One fairly straightforward way of solving the problem described in the previous paragraph is to start a timer and, after a predetermined time delay, the IMC will automatically send a "relock" command to the EL at the end of that time delay interval. The actual amount of time for that to occur can be set either by the USER, or probably more likely by the ADMIN. Depending on what type of transaction is normally to be expected, the time delay could be in the order of 20 or 30 minutes, or perhaps more like two hours before the relock command is automatically sent. For a real estate showing in a potential real estate sales transaction, the typical "showing time" might be approximately one hour. But, of course, such a showing can last longer, and a real estate board might want to use a "safer" time delay, such as two hours, before the relock command is automatically sent. On the other hand, if the transaction is a medical caregiver arriving at a dwelling to provide some medicines to a human occupant, that may typically take only five or ten minutes, and the "automatic relock command" time interval might be set to a "safer" time interval, such as 20 or 30 minutes.

On the other hand, the ADMIN, and perhaps most USERs, may not desire the time delay option that is described above. Therefore, other types of logical approaches can be used. For example, on FIG. 11, once the step 538 has been performed, the logic is directed to a step 540 in which the IMC monitors the presence of the WPC within the geofences. This is referring to the dual geofence situation that is diagramed in FIG. 8, discussed above. A decision step 550 now determines if a WPC is within range of the first geofence 310. If so, then the logic flow is directed back to step 540 where the IMC continues to monitor the presence of the WPC within that geofence. On the other hand, if the WPC is now outside geofence number one (at 310), then a step 552 now sends a relock command from the IMC to the EL. This automatically will solve the problem by relocking the second electronic lock that protects the building (or dwelling) of interest at that site. This application logic of FIG. 11 is now finished, at a return step 560.

Figure 12:
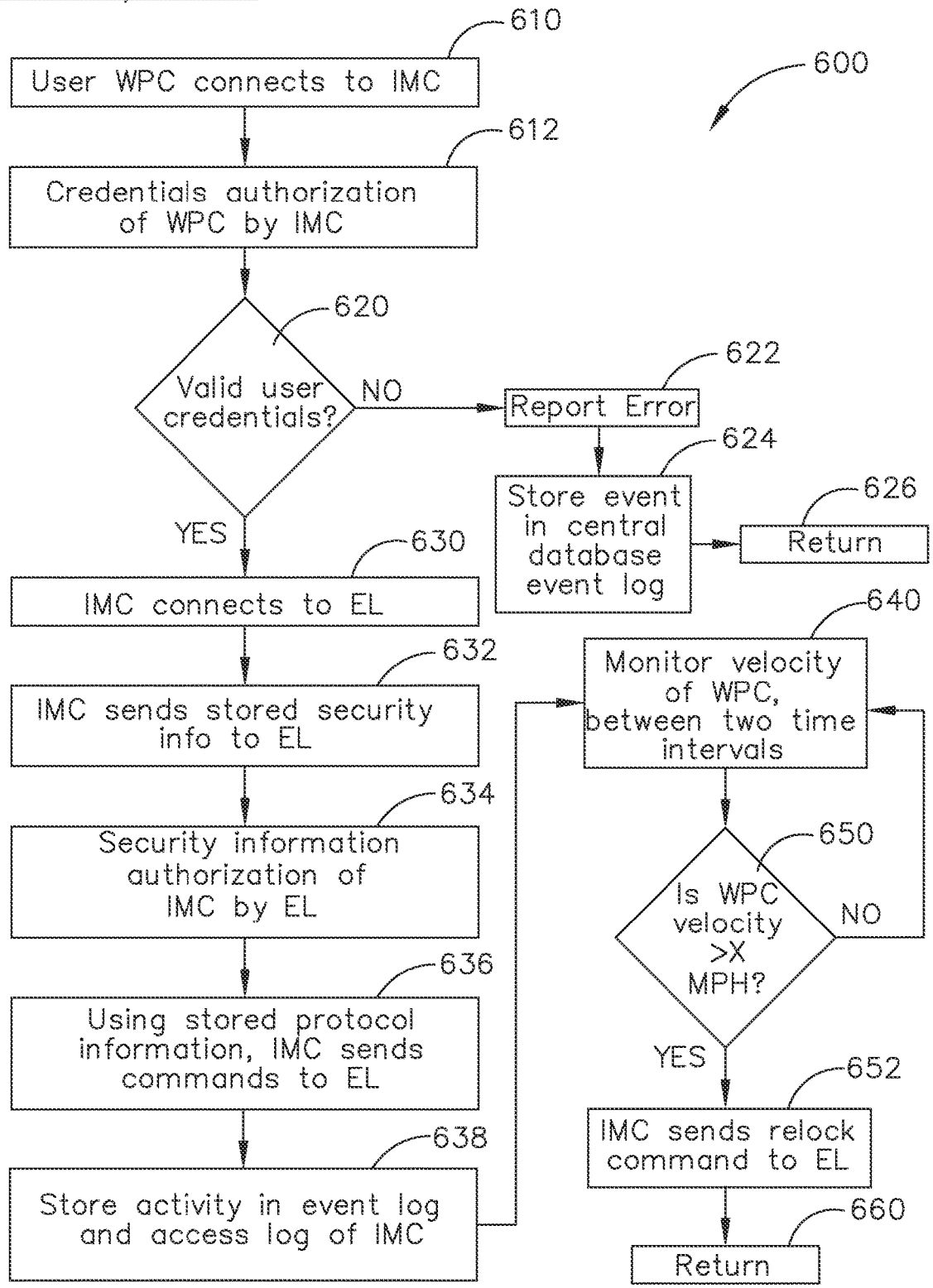
FIG. 12 is a flow chart of some of the steps executed during accessing an electronic lock, as part of the control logic for the technology disclosed herein, in which an automatic relock command is sent to one of the electronic locks based on velocity of the wireless portable computer.

Referring now to FIG. 12, a flow chart 600 is provided to show some of the important operational steps that can be used for accessing a lock that protects a dwelling or building. The flow chart 600 begins at a step 610 with the USER WPC connecting to the IMC, which can be a lockbox or other type of electronic lock or electronic controller. The IMC now must authorize the credentials of the WPC, and that is carried out in a step 612. A decision step 620 now determines whether or not the USER credentials are valid. If not, then the logic flow is directed to a step 622 which reports an error condition, and that error event is stored in the central computer's database event log at a step 624. That event sequence would be the end of this flow chart, and the application returns to other computer operations at a step 626.

On the other hand, if a USER's credentials have been properly validated at decision step 620, then the logic flow is directed to a step 630 where the IMC (or the WPC) connects to the electronic lock EL. After that occurs the IMC (or the WPC) sends stored security information to the EL at a step 532. That security information is then analyzed and authorized by the EL at a step 634; in general, the result of this is that the IMC (or the WPC) now becomes "trusted" by the EL.

It should be noted that, as before, so long as there has been no component failure and no garbled communications messages, the above security authorization of the IMC by the EL in step 634 should always succeed, since the IMC was previously set up with the proper security code and the proper protocol information for that exact EL, as per the flow chart 400. This is one of the chief advantages of this access control system: the USER need not know anything about how to operate the EL of this particular dwelling/building. The USER only needs to know how to authenticate himself/herself to the IMC, and access to the dwelling/building is virtually guaranteed, so long as that setup procedure was correctly done. However, if the MANAGER (a homeowner, for example) manually changes the correct security code on the EL, then everything will of course derail, and a new setup procedure would have to be performed.

The next step at 636 allows the IMC (or the WPC) to send commands to the EL, using stored protocol information. (Such commands will be obeyed by the EL, since the IMC (or the WPC) has now become a "trusted" device.) This activity is now stored in both an event log and an access log of the IMC, at a step 638. At this point, the EL has been unlocked, and the USER will now be allowed to obtain access to the building or dwelling, and may enter the interior spaces of such building/dwelling. As noted above regarding step 636, the IMC (or the WPC) is allowed to send commands to the EL, and typically the first command will be to unlock the EL electronic lock. Later, after the purposes of the visit have been accomplished, the USER can manually send another command from the IMC (or the WPC) to the EL, and that second command could be to relock the electronic lock EL. As noted above, the USER is a human being, and may forget to send that second command, which means that the electronic lock EL would have been left in its unlocked state. Another way that could be handled is discussed below.

Another optional way of automatically relocking the EL is described on the next portion of FIG. 12. Beginning at a step 640, the velocity of the WPC is monitored between two different time marks. This is referring to the situation illustrated on FIG. 9, in which the WPC is at a second position at 332, and then moves to a third position at 334. If those two positions are 10 seconds apart, for example, then the velocity can be quickly and easily determined from the GPS coordinates of those two positions 332 and 334. If the velocity is greater than a certain threshold (such as 15 MPH or 20 MPH), then it can be presumed that the USER is now travelling in a vehicle.

On FIG. 12, this velocity comparison is performed by decision step 650. In the decision step 650 the velocity comparison is with regard to a threshold that is defined as "X MPH." The value for X can be determined by the ADMIN, or perhaps by the USER or some combination of the ADMIN and the USER. Whatever the threshold is, if the answer is NO from the decision step, then the logic flow travels back to step 640 where the velocity continues to be monitored.

Once the velocity of the WPC has exceeded the threshold of X MPH, then the logic flow is directed to a step 652 in which the IMC sends a relock command to the EL. This now automatically relocks the electronic lock that is protecting the building or dwelling. The application logic of FIG. 12 is now finished, and the logic flow is directed to a return step at 660.

It will be understood that most or all of the references to manipulating an electronic lock known as "the EL," and depicted at 270 on FIG. 7 can also be related to an alarm panel 280 that is also found on FIG. 7. In other words, instead of unlocking an electronic lock known as the EL, a command could be sent to the alarm panel 280 to put it in a disarmed condition. This can be true for a first situation where there is an alarm panel 280 but there is no electronic lock at 270, and for a second situation where there are both an alarm panel 280 and an electronic lock 270. In the second situation, the unlock command for the EL can also be duplicated by a second message from the IMC sent to the alarm panel, with the necessary codes and protocols to place that alarm panel 280 into a disarmed state. Later, the EL and IMC could be used to send a "re-arm" command to the alarm panel 280 at the end of a visit to that property, thereby placing the alarm control system back into its armed state.

At the end of a visit, or upon a determination that the visit has essentially been accomplished by the WPC exiting one of the geofences, the system at the IMC is allowed to send a relock command to the EL. As noted above, it will be understood that this could also result in an "arming" command to be sent an alarm panel 280 at the same time, in which that command would be sent by the IMC. It will be understood that whatever pairing is necessary between the IMC and the alarm panel will take place using the same types of logic steps that have been described in the flow charts of FIGS. 10, 11, and 12. Naturally, the communications protocols will be different for an alarm panel than for an electronic lock, so all of that information has to be learned by the ADMIN from the MANAGER at the time of setup (referring to FIG. 10). Furthermore, all the communications protocol information that is used by the alarm panel must also be provided to the ADMIN, and that information either has to be supplied by the MANAGER, or perhaps that information can be learned from knowing the model number and manufacture of the alarm panel. That information must be made available to the wireless portable computer (WPC) 900 or to the IMC 10 (or 800 or 1810), that is provided by the ADMIN. All this information can also be stored at the central computer database at 260, if desired.

In a situation involving a dwelling or other building containing a human occupant, the person arriving at the lock site could be an emergency responding agent (such as a police department officer or a fire department official), and in that situation that person's WPC (e.g., a smart device) could be provided with up-to-date contextual information about a human occupant, and perhaps other information pertaining to conditions on the building site itself that may not necessarily pertain directly to the human occupant. Such emergency personnel would likely have the capability of opening the lock in an emergency situation, so that person (a USER) could be authorized to both receive the contextual data and to open the lock. Other non-emergency personnel may also have reason to require contextual information about a human occupant of a lock-protected property, including repair service persons or administrative service persons, and the like. Moreover, it is possible that the wireless controller and lock "site" could be a moving device such as a vehicle, particularly where the "site" could be an ambulance, or perhaps a mobile home.

In any event, there are several classifications of personnel who might be authorized to obtain access to a site's electronic lock (the EL), by using a WPC (such as a smart phone) to communicate with an IMC (such as a lockbox or a wireless controller), which then communicates with the EL (or helps to enable the WPC to communicate with the EL). Examples of such classifications of personnel include: (a) an emergency medical technician, (b) a routine medical caregiver; (c) a police department officer; (d) a fire department official; (e) an administrative servicing person; (f) a repair servicing person; and (g) a real estate sales agent. Moreover, examples of classifications of objects that might contain an electronic lock could include: (a) a dwelling; (b) a medical care facility; and (c) a vehicle.

As is known in the electronic lockbox technical field, a typical real estate sales electronic lockbox can only be accessed by an authorized user who can provide the correct digital information to that lockbox. In today's modern lockbox systems, the typical real estate sales agent (e.g., a "showing agent") must not only provide a correct credential (or "code") to the lockbox, but also must present that credential during an appropriate time interval, in real time. More specifically, a typical modern lockbox system requires the "electronic key" that is carried by such real estate sales agents to be "rejuvenated" within a specific time interval (such as once per calendar day), and then that electronic key can only be used for the remainder of that same calendar day. If that electronic key was not rejuvenated earlier that same day, then any access attempt would fail—even if all the other access credentials were correct. (In this example, the electronic lockbox acts as an IMC, and the electronic key acts as a WPC.) Therefore, it is clear that the technology systems disclosed herein are quite secure, and their implementation in a real estate board, or in a housing area with dwellers who require periodic medical care visitations, for example, will not degrade the overall level of security of electronic locks (ELs) alone, when used to protect such buildings.

Another way of describing some of the functions described above can be summarized as follows: in a system for operating an electronic lock, there will be an intermediary controller (an IMC) that is assigned to a specific property, a portable computer (a WPC) carried by a human USER, and an electronic lock (an EL) used to protect that specific property. The processing circuits of all three of those electronic products will operate in a coordinated fashion to perform special functions, including: (1) storing, at the IMC, an electronic lock authorization credential pertaining to the EL, (2) communicating data messages between the WPC and the IMC, and performing an authentication routine between the IMC and the WPC, (3) and if there is a successful authentication between the IMC and the WPC, then communicating the electronic lock authorization credential from the IMC (or the WPC) to the EL, and (4) after the EL has received the valid electronic lock authorization credential from the IMC (or the WPC), then sending at least one predetermined command (e.g., to "unlock" or to "re-lock") that will be obeyed by the EL.

Yet another way of describing some of the functions described above can be summarized as follows: in a system for operating an intermediary controller, there will be an intermediary controller (an IMC) that is assigned to a specific property, a portable computer (a WPC) carried by a human USER, and an electronic lock (an EL) used to protect that specific property. The processing circuits of all three of those electronic products will operate in a coordinated fashion to perform special functions, including: (1) pairing the IMC (or the WPC) with the EL; (2) sending pairing information and protocol information relating to the operation of the EL, under control of a human ADMIN (such as a real estate "listing agent"), from the WPC (or the WPC) to the IMC; and (3) storing the pairing information and protocol information in the memory circuit of the IMC for later use by a human USER (such as a real estate "showing agent") who will attempt to open the EL.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein.

Some additional information about "basic" lockbox embodiments, including advanced features, are more fully described in earlier patent documents by the same inventor, and assigned to SentriLock, Inc. or SentriLock LLC, including: U.S. Pat. No. 7,009,489, issued Mar. 7, 2006, for ELECTRONIC LOCK SYSTEM AND METHOD FOR ITS USE; U.S. Pat. No. 6,989,732, issued Jan. 24, 2006, for ELECTRONIC LOCK SYSTEM AND METHOD FOR ITS USE WITH CARD ONLY MODE; U.S. Pat. No. 7,086,258, issued Aug. 8, 2006, for ELECTRONIC LOCK BOX WITH SINGLE LINEAR ACTUATOR OPERATING TWO DIFFERENT LATCHING MECHANISMS; U.S. Pat. No. 7,420,456, issued Sep. 2, 2008, for ELECTRONIC LOCK BOX WITH MULTIPLE MODES AND SECURITY STATES; U.S. Pat. No. 7,193,503, issued Mar. 20, 2007, for ELECTRONIC LOCK SYSTEM AND METHOD FOR ITS USE WITH A SECURE MEMORY CARD; U.S. Pat. No. 7,999,656, issued Aug. 16, 2011, for ELECTRONIC LOCK BOX WITH KEY PRESENCE SENSING; U.S. Pat. No. 7,734,068, issued Jun. 8, 2010, for ELECTRONIC LOCK BOX USING A BIOMETRIC IDENTIFICATION DEVICE; U.S. Pat. No. 8,451,088, issued May 28, 2013, for ELECTRONIC LOCK BOX WITH TRANSPONDER BASED COMMUNICATIONS; U.S. Pat. No. 8,164,419, issued Apr. 24, 2012, for ELECTRONIC LOCK BOX WITH TIME-RELATED DATA ENCRYPTION BASED ON USER-SELECTED PIN; U.S. Pat. No. 8,151,608, issued Apr. 10, 2012, for ELECTRONIC LOCK BOX WITH MECHANISM IMMOBILIZER FEATURES; U.S. patent application Ser. No. 12/756,741, filed on Apr. 8, 2010 (Publication No. US 2011/0251876), for ELECTRONIC LOCK BOX SYSTEM WITH INCENTIVIZED FEEDBACK; U.S. Pat. No. 8,593,252, issued Nov. 26, 2013, for ELECTRONIC LOCK BOX PROXIMITY ACCESS CONTROL; U.S. Pat. No. 8,912,884, issued Dec. 16, 2014, for ELECTRONIC KEY LOCKOUT CONTROL IN LOCKBOX SYSTEM; U.S. patent application Ser. No. 13/830,024, filed on Mar. 14, 2013 (Publication No. US 2014/0266586), for CONTEXTUAL DATA DELIVERY TO MOBILE USERS RESPONSIVE TO ACCESS OF AN ELECTRONIC LOCKBOX; U.S. Pat. No. 9,704,315, issued Jul. 11, 2017, for CONTEXTUAL DATA DELIVERY TO OTHER USERS AT AN ELECTRONIC LOCKBOX; and U.S. Pat. No. 9,830,760, issued Nov. 28, 2017, for CONTEXTUAL DATA DELIVERY TO USERS AT A LOCKED PROPERTY. These patent documents are incorporated by reference herein, in their entirety.

It will be understood that the logical operations described in relation to the flow charts of FIGS. 10-12 can be implemented using sequential logic (such as by using microprocessor technology), or using a logic state machine, or perhaps by discrete logic; it even could be implemented using parallel processors. One preferred embodiment may use a microprocessor or microcontroller (e.g., the processor 16) to execute software instructions that are stored in memory cells within an ASIC. In fact, an entire microprocessor (or microcontroller, for that matter), along with RAM and executable ROM, may be contained within a single ASIC, in one mode of the technology disclosed herein. Of course, other types of circuitry could be used to implement these logical operations depicted in the drawings without departing from the principles of the technology disclosed herein. In any event, some type of processing circuit will be provided, whether it is based on a microprocessor, a logic state machine, by using discrete logic elements to accomplish these tasks, or perhaps by a type of computation device not yet invented; moreover, some type of memory circuit will be provided, whether it is based on typical RAM chips, EEROM chips (including Flash memory), by using discrete logic elements to store data and other operating information, or perhaps by a type of memory device not yet invented.

It will also be understood that the precise logical operations depicted in the flow charts of FIGS. 10-12, and discussed above, could be somewhat modified to perform similar, although not exact, functions without departing from the principles of the technology disclosed herein. The exact nature of some of the decision steps and other commands in these flow charts are directed toward specific future models of lockbox systems (those involving lockboxes sold by SentriLock, LLC, for example) and certainly similar, but somewhat different, steps would be taken for use with other models or brands of lockbox systems in many instances, with the overall inventive results being the same.

It will further be understood that the term "wireless portable computer," as used herein, typically refers to electronic communications equipment that can communicate with an electronic lockbox using a low power radio or optical communication circuit, under the control of a proper APP computer program. In some cases, such a wireless portable computer refers to electronic communications equipment that also is able to use a cellular telephone link to communicate with a wide area network. A typical wireless portable computer is also sometimes known as a "smart device." A smart device that is to be used by a sales agent (as opposed to a sales prospect) could perhaps be replaced by an "electronic key" used with electronic lockboxes, so long as that electronic key includes the necessary cellular telephone link and low power communication circuit, and it has a computer program installed to allow it to function in the manner as described above. In other words, both types of devices ("electronic key" and "smart device") require software to function properly; in the case of a smart device (or "smart phone"), that software is typically called an "APP" whereas in the case of an electronic key, that software can be referred to simply as executable code, or as an executable computer program (for example, a "*.exe" file used in a Windows-based operating system).

It should be noted that several of the communications functions that involve the electronic lock (the "EL") can pass to or from either the IMC (the "intermediary controller") or the WPC (the "wireless portable computer"), and still achieve the overall same results. In other words, for a situation in which the user's "code" is to be sent to the EL, that code (or some form of that type of coded message, encrypted or otherwise) could be sent by the WPC—after the person handling that WPC has entered the proper authorization information—or that code could instead be sent by the IMC. But of course, if that code is going to be sent by the IMC, then the WPC would first need to send the appropriate authorization information to that IMC. The point being made here is this: the software used to perform these functions could be designed either way, as desired by the overall system designer, because many of the messages to the EL could originate either at the IMC or the WPC, and further, many of the messages from the EL could be directed to either the IMC or the WPC, without impeding the system's functionality or security.

It will be understood, from reading the above disclosure information, that the system designer may decide that, for most messages to and from the EL, it is perhaps better to communicate with the WPC, mainly because the WPC is a computer device that is usually kept up to charge with respect to its battery. Most users of wireless portable computers, such as smart phones or real estate electronic keys, typically charge the batteries of such wireless devices every day, so they can attend to the normal business at hand on a daily basis. On the other hand, if the IMC is a typical electronic lockbox that is positioned outdoors, then that lockbox runs on a battery that must be replaced on a periodic basis—perhaps every few years—but nevertheless, any "extra" wireless communications between that lockbox and another wireless device will, of necessity, additionally drain the battery to some extent. On the other hand, again, if the IMC is a "wireless controller" rather than a lockbox, then that wireless controller (a "WC") will likely be mounted indoors, and may well be supplied with line voltage, and therefore, will not necessarily need to worry about its power drain as it performs its wireless communications. Of course, the WC may include a battery, as a backup if for no other reason. But so long as the WC has line voltage available to it, then the system designer will have one less thing to worry about with regard to "how" the three wireless computerized devices should communicate with one another. However, if the WC is to be (more or less) interchangeable with an electronic lockbox in this type of system, then the power requirements of the lockbox (being equipped with a battery, without line voltage) will always be an important consideration for the overall system designer.

Finally, with regard to communications with the EL in the system disclosed herein, there are certain features that should involve communications with the IMC. For example, the IMC is the "on-site" device that makes this entire system possible. In other words, as described above, the user who arrives at a secured property (e.g., a locked building that includes an electronic lock—the "EL") and who is carrying a WPC that is able to communicate with the IMC (and, initially, not directly with the EL), then it is that IMC which contains the communications protocol information and the access code information needed to open that EL. (In other words, it is the IMC that contains that necessary access information, not the WPC.) Therefore, the user with the WPC (such as a real estate "showing agent") must first communicate with the IMC and provide the correct credentials to the IMC, before any attempt is made to open the EL. This allows such users who have no idea "how" to unlock the EL to actually be able to unlock that EL anyway, because those users are authorized to access the IMC, by having the ability to provide proper credentials to the IMC, and once that authorized relationship is established, the user can then open the EL. As noted above, after the user has become known to the IMC as being an "authorized" user, then it is up to the system designer to decide which device (either the IMC or the WPC) will now communicate with the EL, so as to open that electronic lock.

In the example discussed in the previous paragraph, it is clear that the IMC is the on-site repository of information that allows a user with a WPC to open the EL at that same property, without the user having any knowledge about the protocols or access codes that actually need to be supplied to that EL. This situation requires a "setup procedure" to be performed in advance, at the property site where the EL and IMC are located, as discussed above. Again, the IMC must be included in this setup procedure, because the required information that will be needed later by a USER (such as a "showing agent") must be stored on-site, and not on the EL. As described above, an ADMIN performs this setup procedure; in a real estate sales situation, that ADMIN is referred to as the "listing agent." Since the main purpose of having real estate lockboxes in the first place is to make it possible for a different human being to arrive at this property and obtain access so as to show it to a potential buyer, that different human being (the "showing agent") will typically not be the same person as the "listing agent," and therefore, that showing agent cannot open the EL without some help. That help is in the form of the IMC, which is already set-up on that same property site, and which therefore contains the necessary data to open the EL, once the showing agent provides the proper credentials to the IMC from his or her WPC. Although the setup procedure could use either the IMC or the WPC to talk with the EL, and to perform a validation routine to verify that the EL will truly accept the data that will be stored on the IMC, the final result must be to store that important data on the IMC, and not only on the WPC. In fact, for security reasons, the system could be designed so that the "unlocking data" for that EL never goes though the WPC, and is only directed to the IMC. (This is another possible choice to be made by the system designer.)

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal" Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be further understood that any type of product described herein that has moving parts, or that performs functions (such as computers with processing circuits and memory circuits), should be considered a "machine," and not merely as some inanimate apparatus. Such "machine" devices should automatically include power tools, printers, electronic locks, and the like, as those example devices each have certain moving parts. Moreover, a computerized device that performs useful functions should also be considered a machine, and such terminology is often used to describe many such devices; for example, a solid-state telephone answering machine may have no moving parts, yet it is commonly called a "machine" because it performs well-known useful functions.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

Additionally, it will be understood that a computing product that includes a display to show information to a human user, and that also includes a "user operated input circuit" so the human user is able to enter commands or data, can be provided with a single device that is known as a "touchscreen display." In other words, if a patent claim recites a "display" and a "user operated input circuit" as two separate elements, then a single touchscreen display, in actually, is exactly the same thing. It should be noted that a touchscreen display usually includes a virtual keypad, and therefore, a "user operated input circuit" typically comprises a virtual keypad, particularly on smart phones and on tablet computers. Moreover, in this situation, the word "virtual" means that it is not a hardware keypad; more specifically, "virtual" means that it is formed (i.e., "created") on the display screen because of software being executed by a processing circuit.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A wireless controller remote locking system, said system comprising:
   (a) a wireless controller, said wireless controller comprising a first processing circuit, a first memory circuit including instructions executable by the first processing circuit, and a first short range wireless communications circuit, wherein said wireless controller is assigned to a specific property;
   (b) a portable computer, said portable computer comprising a second processing circuit, a second memory circuit including instructions executable by the second processing circuit, a display, a user operated input circuit, and a second short range wireless communications circuit; and
   (c) an alarm control panel used to protect said specific property, said alarm control panel comprising a third processing circuit, a third memory circuit including instructions executable by the third processing circuit, and a third short range wireless communications circuit;
   (d) wherein said first, second, and third processing circuits are configured:
      (i) to connect between said portable computer and said wireless controller, by communicating first data messages between the first and second short range wireless communications circuits, said first data messages including first security information;
      (ii) at said wireless controller, to perform a credentials authorization routine using said first processing circuit to analyze said first security information received from said portable computer;
      (iii) if said portable computer has sent valid credentials, then to connect between said alarm control panel and at least one of said wireless controller and said portable computer, by communicating second data messages between at least two of the first, second, and third short range wireless communications circuits, said second data messages including second security information that was previously stored in said first memory circuit;
      (iv) at said alarm control panel, to perform a security authorization routine using said third processing circuit to analyze said second security information; and
      (v) if at least one of said wireless controller and said portable computer has sent valid security information, then at said alarm control panel, to authorize at least one of said wireless controller and said portable computer to send predetermined commands that will be obeyed by said alarm control panel.

2. The system of claim 1, wherein: one of said predetermined commands comprises a disarm command will be obeyed by said alarm control panel.

3. The system of claim 1, wherein: a human user must manually enter a security code as part of said credentials authorization routine that is performed by said wireless controller, but said human user does not need to enter any further information as part of said security authorization routine that is performed by said alarm control panel.

4. The system of claim 1, further comprising:
   (e) a GPS receiver that is included with said portable computer;
   (f) a first geofence that is based upon GPS coordinates; and
   (g) a second geofence that is based upon a maximum communications range between said first and second short range wireless communications circuits of said wireless controller and said portable computer, wherein said second geofence is larger in diameter than said first geofence;
   (h) wherein said first, second, and third processing circuits are configured:
      (i) at said GPS receiver, to determine a GPS position of said portable computer, and to provide said GPS position to said second processing circuit in near real time;

(ii) at said portable computer, to periodically send said GPS position to said wireless controller using said first and second short range wireless communications circuits;
(iii) at said wireless controller, to monitor said GPS position and determines whether or not said portable computer is within said first geofence;
(iv) if said GPS position is within said first geofence, then at said wireless controller, to continue monitoring said GPS position with respect to said first geofence;
(v) if said GPS position is not within said first geofence, then at said wireless controller, to send a message to said alarm control panel to command the alarm control panel to re-arm, using said first and third short range wireless communications circuits; and
(vi) at said alarm control panel, to obey said command to re-arm.

5. The system of claim 1, further comprising:
(e) a GPS receiver that is included with said portable computer; and
(f) a geofence that is based upon a maximum communications range between said first and second short range wireless communications circuits of said wireless controller and said portable computer;
(g) wherein said first, second, and third processing circuits are configured:
(i) at said GPS receiver, to determine a GPS position of said portable computer, and to provide said GPS position to said second processing circuit in near real time;
(ii) at said portable computer, to periodically send said GPS position to said wireless controller using said first and second short range wireless communications circuits;
(iii) at said wireless controller, to monitor said GPS position at a first time mark, and to monitor said GPS position at a second, later time mark;
(iv) at said wireless controller, to determine a velocity of said portable computer during an interval of real time between said first and second time marks, using said GPS positions at said first and second time marks;
(v) if said velocity is less than a predetermined quantity, then at said wireless controller, to continue monitoring said velocity of the portable computer;
(vi) if said velocity is greater than a predetermined quantity, then at said wireless controller, to send a message to said alarm control panel to command the alarm control panel to re-arm, using said first and third short range wireless communications circuits; and
(vii) at said alarm control panel, to obey said command to re-arm.

6. An electronic lock security system, said system comprising:
(a) an intermediary controller, said intermediary controller comprising a first processing circuit, a first memory circuit including instructions executable by the first processing circuit, and a first short range wireless communications circuit, wherein said intermediary controller is assigned to a specific property;
(b) a portable computer, said portable computer comprising a second processing circuit, a second memory circuit including instructions executable by the second processing circuit, a display, a user operated input circuit, a second short range wireless communications circuit, and a GPS receiver;
(c) an electronic lock used to protect said specific property, said electronic lock comprising a third processing circuit, a third memory circuit including instructions executable by the third processing circuit, a third short range wireless communications circuit, and a physical lock that is under the control of said third processing circuit;
(d) a first geofence that is based upon GPS coordinates; and
(e) a second geofence that is based upon a maximum communications range between said first and second short range wireless communications circuits of said intermediary controller and said portable computer, wherein said second geofence is larger in diameter than said first geofence;
(f) wherein said first, second, and third processing circuits are configured:
(i) at said intermediary controller, to perform a credentials authorization routine using said first processing circuit to analyze first security information received from said portable computer;
(ii) if said portable computer has sent valid credentials, then to connect between said electronic lock and at least one of said intermediary controller and said portable computer, by communicating second security information between at least two of the first, second, and third short range wireless communications circuits;
(iii) at said electronic lock, to perform a security authorization routine using said third processing circuit to analyze said second security information; and
(iv) if at least one of said intermediary controller and said portable computer has sent valid security information, then at said electronic lock, to authorize at least one of said intermediary controller and said portable computer to send an "unlock" command that will be obeyed by said electronic lock.

7. The system of claim 6, wherein:
(g) said first, second, and third processing circuits are further configured:
(i) at said GPS receiver, to determine a GPS position of said portable computer, and to provide said GPS position to said second processing circuit in near real time;
(ii) at said portable computer, to periodically send said GPS position to said intermediary controller using said first and second short range wireless communications circuits;
(iii) at said intermediary controller, to monitor said GPS position and determines whether or not said portable computer is within said first geofence;
(iv) if said GPS position is within said first geofence, then at said intermediary controller, to continue monitoring said GPS position with respect to said first geofence;
(v) if said GPS position is not within said first geofence, then at said intermediary controller, to send a message to said electronic lock to command the electronic lock to relock, using said first and third short range wireless communications circuits; and
(vi) at said electronic lock, to obey said command to relock.

8. The system of claim 6, wherein a human user of said portable computer comprises at least one of:
(a) an emergency medical technician;
(b) a routine medical caregiver;
(c) a police department officer;
(d) a fire department official;
(e) an administrative servicing person;
(f) a repair servicing person; and
(g) a real estate sales agent.

9. The system of claim 6, wherein, said specific property comprises at least one of:
(a) a dwelling;
(b) a medical care facility; and
(c) a vehicle.

10. The system of claim 6, wherein said intermediary controller comprises one of:
(a) a wireless controller; and
(b) an electronic lockbox that further comprises a secure compartment at least a portion of which is movable and is under the control of said first processing circuit.

11. An electronic lock security system, said system comprising:
(a) an intermediary controller, said intermediary controller comprising a first processing circuit, a first memory circuit including instructions executable by the first processing circuit, and a first short range wireless communications circuit, wherein said intermediary controller is assigned to a specific property;
(b) a portable computer, said portable computer comprising a second processing circuit, a second memory circuit including instructions executable by the second processing circuit, a display, a user operated input circuit, a second short range wireless communications circuit, and a GPS receiver;
(c) an electronic lock used to protect said specific property, said electronic lock comprising a third processing circuit, a third memory circuit including instructions executable by the third processing circuit, a third short range wireless communications circuit, and a physical lock that is under the control of said third processing circuit; and
(d) a geofence that is based upon a maximum communications range between said first and second short range wireless communications circuits of said electronic lockbox and said portable computer;
(e) wherein said first, second, and third processing circuits are configured:
(i) at said intermediary controller, to perform a credentials authorization routine using said first processing circuit to analyze first security information received from said portable computer;
(ii) if said portable computer has sent valid credentials, then to connect between said electronic lock and at least one of said intermediary controller and said portable computer, by communicating second security information between at least two of the first, second, and third short range wireless communications circuits;
(iii) at said electronic lock, to perform a security authorization routine using said third processing circuit to analyze said second security information; and
(iv) if at least one of said intermediary controller and said portable computer has sent valid security information, then at said electronic lock, to authorize at least one of said intermediary controller and said portable computer to send an "unlock" command that will be obeyed by said electronic lock.

12. The system of claim 11, wherein:
(f) said first, second, and third processing circuits are further configured:
(i) at said GPS receiver, to determine a GPS position of said portable computer, and to provide said GPS position to said second processing circuit in near real time;
(ii) at said portable computer, to periodically send said GPS position to said intermediary controller using said first and second short range wireless communications circuits;
(iii) at said intermediary controller, to monitor said GPS position at a first time mark, and to monitor said GPS position at a second, later time mark;
(iv) at said intermediary controller, to determine a velocity of said portable computer during an interval of real time between said first and second time marks, using said GPS positions at said first and second time marks;
(v) if said velocity is less than a predetermined quantity, then at said intermediary controller, to continue monitoring said velocity of the portable computer;
(vi) if said velocity is greater than a predetermined quantity, then at said intermediary controller, to send a message to said electronic lock to command the electronic lock to relock, using said first and third short range wireless communications circuits; and
(vii) at said electronic lock, to obey said command to relock.

13. The system of claim 11, wherein a human user of said portable computer comprises at least one of:
(a) an emergency medical technician;
(b) a routine medical caregiver;
(c) a police department officer;
(d) a fire department official;
(e) an administrative servicing person;
(f) a repair servicing person; and
(g) a real estate sales agent.

14. The system of claim 11, wherein, said specific property comprises at least one of:
(a) a dwelling;
(b) a medical care facility; and
(c) a vehicle.

15. The system of claim 11, wherein said intermediary controller comprises one of:
(a) a wireless controller; and
(b) an electronic lockbox that further comprises a secure compartment at least a portion of which is movable and is under the control of said first processing circuit.

* * * * *